US012079417B2

(12) United States Patent
King-Smith et al.

(10) Patent No.: US 12,079,417 B2
(45) Date of Patent: *Sep. 3, 2024

(54) COMBINATION TOUCH AND TRANSDUCER INPUT SYSTEM AND METHOD

(71) Applicant: Wacom Co., Ltd., Saitama (JP)

(72) Inventors: Oliver P. King-Smith, Aptos, CA (US); Bernardus H. Smit, San Jose, CA (US); Peyman Hadizad, Redwood City, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,667

(22) Filed: Jun. 9, 2023

(65) Prior Publication Data

US 2023/0376139 A1    Nov. 23, 2023

Related U.S. Application Data

(63) Continuation of application No. 18/332,633, filed on Jun. 9, 2023, which is a continuation of application
(Continued)

(51) Int. Cl.
*G06F 3/045*     (2006.01)
*G06F 3/0354*    (2013.01)
(Continued)

(52) U.S. Cl.
CPC ...... *G06F 3/04162* (2019.05); *G06F 3/03545* (2013.01); *G06F 3/0383* (2013.01);
(Continued)

(58) Field of Classification Search
CPC ............. G06F 3/04162; G06F 3/03545; G06F 3/0383; G06F 3/0416; G06F 3/04166;
(Continued)

(56) References Cited

U.S. PATENT DOCUMENTS 3,886,311 A  5/1975 Rodgers et al.
4,131,880 A  12/1978 Siy et al.
(Continued)

FOREIGN PATENT DOCUMENTS

CN   1659502 A     8/2005
JP   59-23849 U1   2/1984
(Continued)

OTHER PUBLICATIONS

Chinese Office Action, dated Apr. 3, 2016, for corresponding Chinese Application No. 201310722109.1, 6 pages.
(Continued)

*Primary Examiner* — Thuy N Pardo
(74) *Attorney, Agent, or Firm* — Seed IP Law Group LLP

(57) ABSTRACT

A combination touch and transducer input system is provided, which facilitates user input into an electronic system with a finger and/or a transducer (e.g., a stylus). The system includes a transducer configured to generate an electric field, and a sensor including an array of electrodes and a controller. The transducer is configured to transmit digital data, such as pen pressure data and switch status data, to the sensor. For example, the transducer comprises electronic circuitry configured to encode the digital data in a signal for transmission to the sensor. The sensor controller is configured to operate both in a touch sensing mode and in a transducer sensing mode. During the touch sensing mode, the controller determines a position of a proximate object (e.g., a finger) by capacitively sensing the object with the array of electrodes. During the transducer sensing mode, the controller determines a position of the transducer based on a signal received by the array of electrodes from the transducer, and also receives and decodes the digital data encoded in the received signal. Digital data can be encoded in a signal
(Continued)

using any suitable digital modulation techniques, such as a Frequency-Shift Keying (FSK) technique.

10 Claims, 12 Drawing Sheets

Related U.S. Application Data

No. 17/898,124, filed on Aug. 29, 2022, now Pat. No. 11,720,201, which is a continuation of application No. 17/090,698, filed on Nov. 5, 2020, now Pat. No. 11,429,221, which is a continuation of application No. 16/040,074, filed on Jul. 19, 2018, now Pat. No. 10,860,138, which is a continuation of application No. 15/694,237, filed on Sep. 1, 2017, now Pat. No. 10,042,477, which is a continuation of application No. 15/288,862, filed on Oct. 7, 2016, now Pat. No. 9,753,584, which is a continuation of application No. 14/738,021, filed on Jun. 12, 2015, now Pat. No. 9,495,037, which is a continuation of application No. 13/915,596, filed on Jun. 11, 2013, now Pat. No. 9,182,835, which is a continuation of application No. 12/568,066, filed on Sep. 28, 2009, now Pat. No. 8,482,545.

(60) Provisional application No. 61/102,234, filed on Oct. 2, 2008.

(51) Int. Cl.
*G06F 3/038* (2013.01)
*G06F 3/041* (2006.01)
*G06F 3/044* (2006.01)
*G06F 3/046* (2006.01)

(52) U.S. Cl.
CPC ........ *G06F 3/0416* (2013.01); *G06F 3/04166* (2019.05); *G06F 3/0418* (2013.01); *G06F 3/044* (2013.01); *G06F 3/0441* (2019.05); *G06F 3/0442* (2019.05); *G06F 3/0446* (2019.05); *G06F 3/046* (2013.01); *G06F 2203/04104* (2013.01); *G06F 2203/04105* (2013.01); *G06F 2203/04106* (2013.01); *G06F 2203/04108* (2013.01)

(58) Field of Classification Search
CPC ...... G06F 3/0418; G06F 3/044; G06F 3/0441; G06F 3/0442; G06F 3/0446; G06F 3/046; G06F 2203/04104; G06F 2203/04105; G06F 2203/04106; G06F 2203/04108
USPC .................. 345/173, 179, 180, 156, 174
See application file for complete search history.

(56) References Cited

U.S. PATENT DOCUMENTS

| | | | |
|---|---|---|---|
| 4,513,437 A | 4/1985 | Chainer et al. | |
| 4,672,154 A | 6/1987 | Rodgers et al. | |
| 4,686,332 A | 8/1987 | Greanias et al. | |
| 4,695,680 A | 9/1987 | Kable | |
| 5,117,071 A | 5/1992 | Greanias et al. | |
| 5,305,017 A | 4/1994 | Gerpheide | |
| 5,349,139 A | 9/1994 | Verrier et al. | |
| 5,365,461 A | 11/1994 | Stein et al. | |
| 5,386,219 A | 1/1995 | Greanias et al. | |
| 5,475,401 A | 12/1995 | Verrier et al. | |
| 5,543,589 A | 8/1996 | Buchana et al. | |
| 5,729,251 A * | 3/1998 | Nakashima | G06F 3/03545 345/173 |
| 5,790,106 A | 8/1998 | Hirano et al. | |
| 5,914,708 A | 6/1999 | LaGrange et al. | |
| 5,940,065 A | 8/1999 | Babb et al. | |
| 5,942,733 A | 8/1999 | Allen et al. | |
| 6,577,299 B1 | 6/2003 | Schiller et al. | |
| 6,762,752 B2 | 7/2004 | Perski et al. | |
| 7,292,229 B2 | 11/2007 | Morag et al. | |
| 7,361,509 B2 | 4/2008 | Hyde et al. | |
| 7,372,455 B2 | 5/2008 | Perski et al. | |
| 7,520,858 B2 | 4/2009 | Ofek et al. | |
| 7,839,394 B2 | 11/2010 | Zloter et al. | |
| 7,868,778 B2 | 1/2011 | Kenwright | |
| 7,868,873 B2 | 1/2011 | Palay et al. | |
| 8,089,470 B1 | 1/2012 | Schediwy et al. | |
| 9,280,220 B2 | 3/2016 | Shabparnia et al. | |
| 2002/0192009 A1 | 12/2002 | Tuli | |
| 2003/0214490 A1 | 11/2003 | Cool | |
| 2004/0140965 A1 | 7/2004 | Wang et al. | |
| 2004/0189612 A1 | 9/2004 | Bottari et al. | |
| 2005/0104870 A1 | 5/2005 | Jurisch et al. | |
| 2005/0110777 A1 | 5/2005 | Geaghan et al. | |
| 2005/0162411 A1 | 7/2005 | Berkel van | |
| 2005/0248547 A1 | 11/2005 | Kent et al. | |
| 2005/0248548 A1 | 11/2005 | Tsumura et al. | |
| 2006/0028457 A1 | 2/2006 | Burns | |
| 2007/0018076 A1 | 1/2007 | Chen et al. | |
| 2007/0058868 A1 | 3/2007 | Seino et al. | |
| 2007/0146351 A1 | 6/2007 | Katsurhim et al. | |
| 2007/0171211 A1 | 7/2007 | Perski et al. | |
| 2007/0177333 A1 | 8/2007 | Palay et al. | |
| 2007/0177533 A1* | 8/2007 | Palay | G06F 3/03545 370/295 |
| 2007/0227785 A1 | 10/2007 | Katsurahira | |
| 2007/0252821 A1 | 11/2007 | Hollemans et al. | |
| 2008/0048997 A1* | 2/2008 | Gillespie | G06V 40/20 345/174 |
| 2008/0009254 A1 | 5/2008 | Katsurahira | |
| 2009/0033632 A1 | 2/2009 | Szolyga et al. | |
| 2009/0013746 A1 | 3/2009 | Zloter et al. | |
| 2009/0309851 A1* | 12/2009 | Bernstein | G06F 3/0446 345/174 |
| 2010/0061356 A1 | 3/2010 | Stern et al. | |
| 2010/0083323 A1 | 4/2010 | King-Smith et al. | |
| 2011/0148796 A1 | 6/2011 | Hollemans et al. | |
| 2011/0254812 A1 | 10/2011 | Kent et al. | |
| 2011/0298421 A1 | 12/2011 | Palay et al. | |
| 2012/0050333 A1* | 3/2012 | Bernstein | G06F 3/041661 345/660 |
| 2012/0133620 A1 | 5/2012 | Takeuchi et al. | |
| 2013/0093715 A1 | 4/2013 | Marsden et al. | |
| 2013/0265265 A1 | 10/2013 | Stern | |
| 2013/0278527 A1 | 10/2013 | Hollemans et al. | |
| 2013/0285984 A1 | 10/2013 | Degner et al. | |

FOREIGN PATENT DOCUMENTS

| | | |
|---|---|---|
| JP | 6-161640 A | 6/1994 |
| JP | 7-500435 A | 12/1995 |
| JP | 8-137607 A | 5/1996 |
| JP | 8-147092 A | 6/1996 |
| JP | 8-234902 A | 9/1996 |
| JP | 9-244786 A | 9/1996 |
| JP | 2002-297300 A | 10/2002 |
| JP | 2007-164356 A | 6/2007 |
| JP | 2008-84310 A | 4/2008 |
| JP | 2008-152640 A | 7/2008 |
| TW | 200625155 A | 7/2006 |
| TW | 1300190 B | 8/2008 |
| WO | 93/08551 A1 | 4/1993 |
| WO | 2008/007118 A2 | 1/2008 |

OTHER PUBLICATIONS

Chinese Office Action, dated Mar. 26, 2013, for corresponding Chinese Application No. 200910179037.4, 9 pages.
Communication Pursuant to Article 94(3) EPC, dated Feb. 16, 2015, for corresponding European Application No. 09 012 472 8-1507, 6 pages.

(56) References Cited

OTHER PUBLICATIONS

Notice of Allowance, dated Jan. 19, 2015, for U.S. Appl. No. 14/229,685, King-Smith et al., "Combination Touch and Transducer Input System and Method," 25 pages.
Japanese Office Action, dated Dec. 4, 2012, for corresponding Japanes Application No. 2009-229848, 3 pages.
Japanese Office Action, dated Jul. 9, 2013, for corresponding Japanese Application No. 2009-229484, 4 pages.
Japanese Office Action, dated Aug. 4, 2015, for corresponding Japanese Application 2014-124427, 4 pages.
Taiwanese Office Action, dated Mar. 16, 2016, for corresponding Taiwanese Application No. 104105647, 5 pages.
Taiwanese Office Action, dated Oct. 6, 2014, for corresponding Taiwanese Application No. 98133397, 8 pages.

* cited by examiner

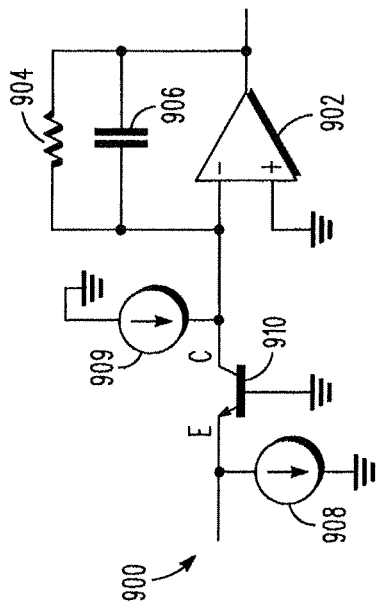
FIG. 10
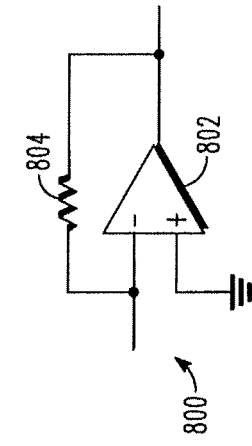
FIG. 9
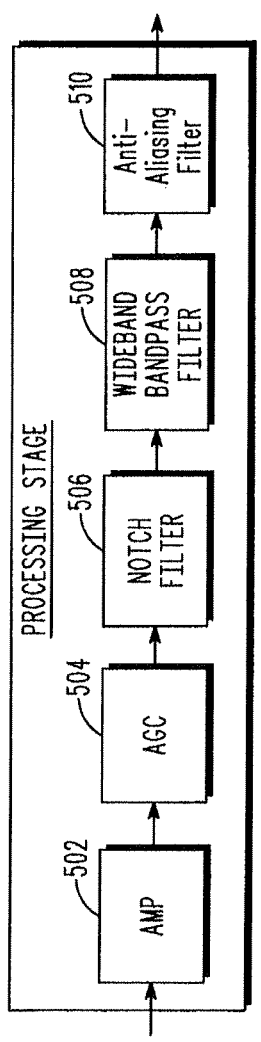
FIG. 6
FIG. 8
FIG. 7
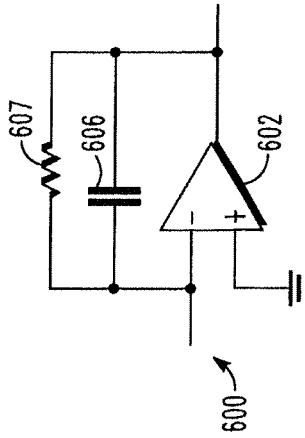

COMBINATION TOUCH AND TRANSDUCER INPUT SYSTEM AND METHOD

BACKGROUND

Field of the Invention

The present invention generally relates to user interfaces for electric devices, and more specifically relates to touch sensors and digitizer systems.

Description of the Related Art

A variety of different types of input devices are commonly used in a variety of different electronic systems, including computers (e.g., laptop computers, tablet computers, personal digital assistants) and communication devices (e.g., mobile phones, wireless handheld communication devices). One type of input device is generally referred to as a touch sensor or proximity sensor. A touch sensor uses a variety of different techniques to determine the position of proximate objects, such as fingers. For example, capacitive touch sensors determine the position of proximate objects by determining a change in capacitance that occurs due to the presence of proximate objects. Another type of input device is commonly referred to as a digitizer tablet, but also referred to as a graphics tablet, graphics pad, or drawing tablet. Digitizer tablets include a sensing surface upon which a user can enter input using a transducer, typically implemented as a stylus or other pen-like drawing apparatus. In typical digitizers, the transducer emits an electromagnetic signal, which is detected by the sensing surface. The electromagnetic signal detected by the sensing surface is then used and processed to determine the position of the transducer.

In general, digitizers offer increased position-detection accuracy and resolution when compared to typical touch sensors. Digitizers typically require the use of a specialized transducer for inputting. It has been desirable to combine the attributes (e.g., convenience) of touch sensors with the improved accuracy and resolution of digitizers. Unfortunately, combination touch sensor-digitizers have had limited applicability, mainly due to high cost and complexity associated with implementation, the additional three-dimensional space required to accommodate the combination, and the requirement for special types of displays that could support both touch sensing and transducer (e.g., stylus) sensing. Thus, there remains a continuing need for improved combination touch sensor and transducer-based input devices.

BRIEF SUMMARY

This summary is provided to introduce a selection of concepts in a simplified form that is further described below in the Detailed Description. This summary is not intended to identify key features of the claimed subject matter nor is it intended to be used as an aid in determining the scope of the claimed subject matter.

The embodiments of the invention provide systems and methods for facilitating user input into an electronic system. Combination touch and transducer input systems are provided, which facilitate user input both with ordinary objects (e.g., fingers) and with transducers that emit an electric field for position detection.

According to one aspect of the invention, a combination touch and transducer input system is provided, which includes a transducer (e.g., a stylus), an array of electrodes, and a controller coupled to the array of electrodes. The array of electrodes and the controller together form a sensor that is used for detecting both the position of a proximate object, such as a finger, and the position of the transducer. The transducer is typically in the form of a stylus or other pen-like apparatus, and is configured to generate an electric field. The controller of the sensor is configured to operate in a proximate object sensing mode (hereinafter the "touch mode") and in a transducer sensing mode (hereinafter the "transducer mode"), either simultaneously or in an alternating manner by switching between the two modes in successive sampling periods.

When operating in the touch mode, the controller determines the position(s) of one or more proximate objects (e.g., fingers) by capacitively sensing the object(s) with the array of electrodes. In one example, the controller determines the position of each object by detecting a change in capacitance caused by that object in the array of electrodes. When operating in the transducer mode, the controller determines a position of the transducer by measuring attributes (e.g., amplitudes, phases, etc.) of a plurality of sensing signals that are induced in the array of electrodes by the electric field generated by the transducer. Specifically, as the transducer (an antenna) and each of the array of electrodes are capacitively coupled, the controller determines the position of the transducer by measuring a charge induced at each of the array of electrodes.

The transducer is further configured to send digital data to the sensor. For example, the transducer may include electronic circuitry (e.g., a microcontroller unit (MCU) or microprocessor) configured to encode digital data in the electric field for transmission to the array of electrodes, and the controller of the sensor is configured to decode the digital data received by the array of electrodes. For example, the digital data may include data related to the transducer's pen tip pressure, the transducer's switch status, or the transducer's unique ID.

According to another aspect of the invention, the transducer is configured to selectively generate an electric field at multiple frequencies and to encode digital data in frequency shifts of the generated electric field, while the controller is configured to detect the plurality of sensing signals at multiple frequencies and to decode the digital data encoded in the frequency shifts. The multiple frequencies may be determined, for example, by dividing down a base frequency, so as to avoid harmonics generated by any signal transmitted by the transducer. Any suitable Frequency-Shift Keying (FSK) technique, including the Manchester coding scheme, may be used to encode digital data. According to a further aspect of the invention, any other digital modulation technique may be used to encode digital data, including Amplitude-Shift Keying (ASK) technique, Phase-Shift Keying (PSK) technique, and Quadrature Amplitude Modulation (QAM) technique.

In accordance with another aspect of the invention, the digital data transmission may be bi-directional. That is, in addition to the transducer transmitting digital data to the controller, the controller may be configured to transmit digital data to the transducer.

According to one aspect of the invention, the transducer and the controller communicate asynchronously.

According to one aspect of the invention, the transducer is configured to selectively generate the electric field at multiple frequencies and the controller is further configured to select one (or more) of the multiple frequency channels as receiving channel(s). For example, the controller may determine a signal-to-noise ratio for each frequency channel and select the frequency channel having the highest signal-to-noise ratio as the receiving channel. According to a further aspect of the invention, when two or more combination touch and transducer input systems are provided, the transducer of the first system is configured to generate the electric field at a first frequency (or a first set of frequencies) and the transducer of the second system is configured to generate the electric field at a second frequency (or a second set of frequencies) different from the first frequency (or the first set of frequencies), to avoid cross-coupling between the two systems that may be used proximate to each other.

According to one aspect of the invention, the array of electrodes includes a first set of elongate electrodes arranged substantially in parallel with each other and extending in a first direction and a second set of elongate electrodes arranged substantially in parallel with each other and extending in a second direction that is different from the first direction. For example, the first and second directions may be generally perpendicular to each other. Each pair of at least one of the first set of elongate electrodes and at least one of the second set of elongate electrodes forms a capacitor. When operating in the touch mode, the controller is configured to supply a signal to each of the first set of elongate electrodes, detect a capacitance change reflected in a signal outputted from each of the second set of elongate electrodes, and determine the position of the proximate object based on the detected capacitance change.

When operating in the transducer mode using the electric field coupling, the controller is configured to measure attributes (e.g., amplitudes and phases) of a plurality of sensing signals outputted from both the first and second sets of elongate electrodes and calculate the position of the transducer based on the measured attributes. According to a further aspect of the invention, when operating in the transducer mode, the controller is configured to measure an attribute of a sensing signal outputted from each of the first or second set of elongate electrodes while selectively terminating (e.g., floating, terminating via a resistor to ground, or grounding) two or more of the first or second set of elongate electrodes that are adjacent to that elongate electrode being sensed, to thereby improve the quality of the sensing signal.

According to one aspect of the invention, the controller is configured to alternate between operating in the touch mode and operating in the transducer mode in successive sampling periods of the system. According to another aspect of the invention, the operating mode may be selected by a user of the system. According to a further aspect of the invention, the controller is configured to selectively divide the array of electrodes into a touch mode section and a transducer mode section, and to simultaneously operate in the touch mode in the touch mode section and in the transducer mode in the transducer mode section. The touch mode section may consist of a plurality of touch mode sub-sections, while the transducer mode section may consist of a plurality of transducer mode sub-sections. According to a still further aspect of the invention, the controller periodically switches the touch mode section and the transducer mode section such that a given point on the array of electrodes alternates between being in the touch mode section and being in the transducer mode section.

According to one aspect of the invention, the controller includes a cascoded transimpedance amplifier coupled to the array of electrodes. The cascoded transimpedance amplifier is configured to amplify the plurality of sensing signals induced by the electric field in the array of electrodes, while advantageously isolating the input capacitance of the array of electrodes from the feedback resistor of the transimpedance amplifier.

According to one aspect of the invention, the transducer includes a capacitor or a battery that is configured to function as a power supply for the transducer.

According to a further aspect of the invention, the controller is configured to determine the position of the transducer by fitting the measured attributes (e.g., amplitudes, phases, etc.) of the plurality of sensing signals to a pre-determined parameterized curve. According to one aspect of the invention, the pre-determined parameterized curve relates a plurality of positions of the transducer relative to one electrode with a plurality of attributes of sensing signals induced in that electrode by the transducer at the plurality of positions, respectively. According to one aspect of the invention, the pre-determined parameterized curve is empirically derived for use with the transducer having a particular tip shape and the array of electrodes having a particular electrode configuration pattern. According to one aspect of the invention, the pre-determined parameterized curve includes a position parameter and at least one or more of a height parameter and a tilt parameter. According to one aspect of the invention, the system further comprises an external processor, such as a processor in a host system (e.g., a PC that includes the combination touch and transducer input system), and the controller and the external processor perform the curve fitting operation, which may be computationally intensive, in distributed processing.

According to another aspect of the invention, a cordless transducer is provided, which is configured for use with an array of electrodes, wherein the cordless transducer and the array of electrodes are capacitively coupled. The cordless transducer includes a pen-shaped housing including a pen tip at its distal end, and a transducer controller arranged within the pen-shaped housing. The transducer controller controls the operation of the cordless transducer, and includes a pressure sensor for detecting the pressure applied to the pen tip. The cordless transducer also includes an antenna coupled to the transducer controller to transmit the pressure sensor data, which is detected by the pressure sensor, as digital data to the array of electrodes. The transducer controller includes a power storage device, such as a battery or a capacitor, which supplies power to drive the transducer controller, to thereby achieve the cordless transducer.

According to another aspect of the invention, a combination touch and transducer input system is provided, which includes a cordless transducer described above, and a sensor. The sensor includes an array of electrodes and a sensor controller coupled to the array of electrodes. The sensor controller is configured to operate in both a touch mode to determine a position of a proximate object by capacitively sensing the object with the array of electrodes, and in a transducer mode to determine a position of the cordless transducer by measuring attributes of a plurality of sensing signals induced in the array of electrodes by the electric field generated by the cordless transducer. The cordless transducer transmits pressure sensor data as digital data to the sensor.

According to a further aspect of the invention, a method is provided for selectively determining a position of a proximate object and a position of a transducer. The method includes eight steps. First, a proximate object is capacitively sensed with an array of electrodes. Second, a position of the proximate object is determined based on the capacitive sensing. Third, an electric field is generated with the transducer. Fourth, digital data is transmitted from the transducer.

Fifth, a plurality of sensing signals are induced based on the electric field in a corresponding plurality of electrodes in the array of electrodes. Sixth, attributes of the plurality of sensing signals are measured. Seventh, a position of the transducer is determined based on the measured attributes of the plurality of sensing signals. Eighth, the digital data is received with the array of electrodes.

BRIEF DESCRIPTION OF THE SEVERAL VIEWS OF THE DRAWINGS

The present invention may more readily be understood by reference to the accompanying drawings in which:

FIG. 6 is a block diagram of a processing stage, which may be included in the controller of FIG. 5A, in accordance with an embodiment of the invention;

FIG. 7 is a circuit representation of a charge amplifier, which may be included in the processing stage of FIG. 6, in accordance with an embodiment of the invention;

FIG. 8 is a circuit representation of a voltage amplifier, which may be included in the processing stage of FIG. 6, in accordance with an embodiment of the invention;

FIG. 9 is a circuit representation of a transimpedance amplifier, which may be included in the processing stage of FIG. 6, in accordance with an embodiment of the invention;

FIG. 10 is a circuit representation of a cascoded transimpedance amplifier, which may be included in the processing stage of FIG. 6, in accordance with an embodiment of the invention;

DETAILED DESCRIPTION

The embodiments of the invention provide systems and methods for facilitating user input into an electronic system. A combination touch and transducer input system is provided, which facilitates user input with both ordinary objects (e.g., fingers) and transducers (e.g., styluses) that emit an electric field for position detection.

Figure 1:
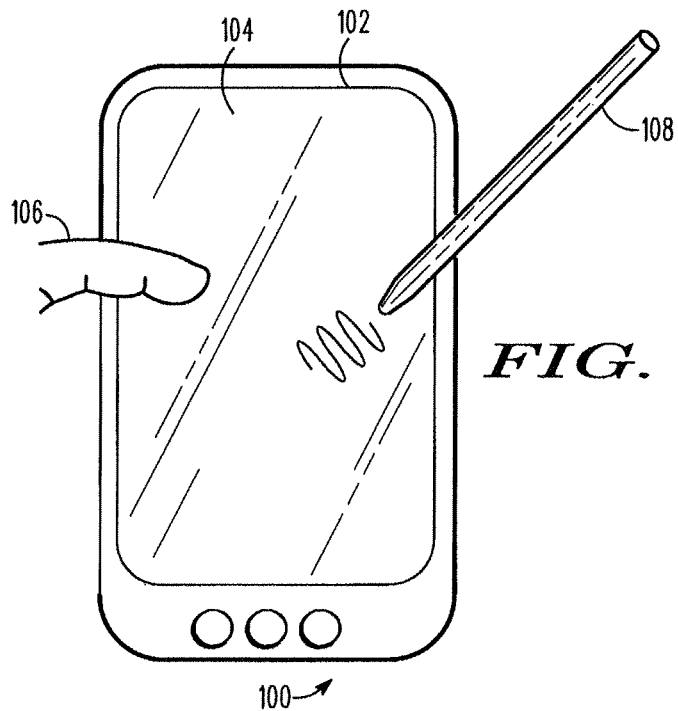
FIG. 1 shows a tablet computer, which includes a combination touch and transducer input system in accordance with an embodiment of the invention.

FIG. 1 shows an exemplary tablet computer 100, suitable for incorporating a combination touch and transducer input system according to an embodiment of the present invention. The tablet computer 100 includes a display 102, such as a LCD device, over which a generally transparent sensing surface 104 is provided. The sensing surface 104 may form part of the combination touch and transducer input system of the present invention, which is used to detect ordinary objects (e.g., finger 106) as well as to detect one or more transducers (e.g., stylus 108). Specifically, within or beneath the sensing surface 104 is an array of electrodes (not shown in FIG. 1) that are configured to capacitively sense a proximate object as well as to receive an electric field generated by a transducer to thereby detect the position of the transducer.

According to various exemplary embodiments of the present invention, the combination touch and transducer input system is configured to operate in a touch sensing mode (or "touch mode" for short) and in a transducer sensing mode (or "transducer mode" for short), either simultaneously or in an alternating manner by switching between the two modes in successive sampling periods. In the touch mode, the system is configured to determine a position of a proximate object by capacitively sensing the object with the array of electrodes. In the transducer mode, the system is configured to determine a position of a transducer by measuring attributes (e.g., amplitudes, phases, etc.) of a plurality of sensing signals that are induced in the array of electrodes by an electric field generated by the transducer. The same array of electrodes is used for both touch sensing and transducer sensing. A user can thus interface with the tablet computer 100 with either an ordinary object (such as a finger 106) or with the transducer (such as a stylus 108). During operation, a user can thus use the finger 106 and/or the stylus 108 and the sensing surface 104 to perform a variety of user interface functions, such as activating icons, moving a cursor, and entering text and other data.

While the illustrated embodiment shows a tablet computer 100, the embodiments of the invention can be applied in any type of devices that utilize an input device. Examples include other computing devices, media devices, and communication devices. Furthermore, while the illustrated embodiment shows a finger 106, any other capacitive object (having a size sufficient to form a mutual capacitance with at least one electrode) can be used for interfacing with the sensor operating in the touch mode. Finally, while the illustrated embodiment shows a stylus 108, any other suitable transducer can be used, including other pen-like devices, pointers, cursors, pucks, mice, pawns, and other implements.

Figure 2:
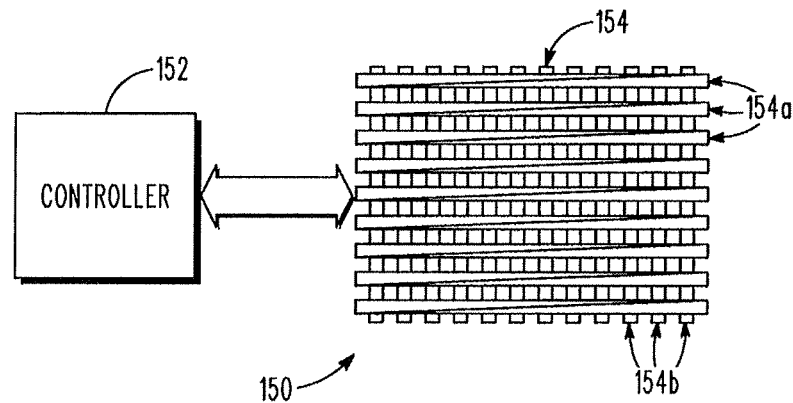
FIG. 2 is schematic representation of a sensor for use in a combination touch and transducer input system, the sensor including a controller and an array of electrodes, in accordance with an embodiment of the invention.

A combination touch and transducer input system generally consists of a transducer (e.g., the stylus 108 in FIG. 1) and a sensor 150, which is shown in FIG. 2. The sensor 150 includes a sensor controller 152 and an array of electrodes 154. In the illustrated embodiment, the array of electrodes 154 includes a first set of generally elongate electrodes 154a extending in a first (e.g., horizontal) direction, and a second set of generally elongate electrodes 154b extending in a second (e.g., vertical) direction that is different from (e.g., perpendicular to) the first direction. A sheet or other geometrical arrangement of dielectric material (e.g., glass, not shown) is interposed between the first and second sets of elongate electrodes 154a and 154b. Also, another sheet of material such as glass (not shown in FIG. 2) overlays the array of electrodes 154 to insulate and physically protect the array of electrodes 154, to collectively function as the sensing surface 104 of FIG. 1.

Typically, the array of electrodes 154 is formed by depositing transparent conductive material on one or more sheets. For example, a conductor such as indium tin oxide (ITO) may be patterned on one side or both sides of a glass sheet to form the first and second sets of elongate electrodes 154a and 154b, respectively, over which another glass sheet may be applied to form the sensing surface 104. A variety of different electrode shapes (e.g., diamond-shaped electrodes and square-shaped electrodes) as well as array patterns may be used, and the array of electrodes 154 for use in the present invention is not limited to the specific configuration illustrated in FIG. 2. For example, while FIG. 2 shows the array of electrodes 154 formed with two layers of overlapping rectangular electrodes, other configurations are available in which the first and second sets of electrodes (e.g., diamond-shaped electrodes) do not substantially overlap with each other and thus may be provided generally on a single layer. In various other embodiments, the first and second sets of electrodes do not extend substantially perpendicularly to each other but rather merely extend in two different directions. In further embodiments, the electrodes in each set need not be substantially in parallel with each other. Still further, the array pattern may include not only the first and second sets of electrodes, but also the third, fourth, and additional sets of electrodes that are suitably arranged.

The controller 152 of the sensor 150 is configured to perform signal processing for position determination in the combination touch and transducer input system. As will be more fully described below in reference to FIG. 5A, the sensor controller 152 suitably comprises any type of processing device, including single integrated circuits such as a microprocessor. Additionally, the sensor controller 152 may include multiple separate devices, including any suitable number of integrated circuit devices and/or circuit boards working in cooperation. For example, the sensor controller 152 may include devices such as microcontrollers, processors, multiplexers, filters, amplifiers and interfaces. Finally, in some applications the sensor controller 152 is configured to execute programs contained within a memory.

When operating in the touch mode, the sensor controller 152 is configured to determine positions of one or more proximate object(s) by capacitively sensing each object with the array of electrodes 154. Various techniques for capacitive touch detection are known in the art, including multi-touch detection techniques capable of detecting multiple touches at a time. For example, as the sensor controller 152 sequentially drives a signal to each of the first set of elongate electrodes 154a in the array of electrodes 154 as shown in FIG. 2, each intersection of the first set of elongate electrodes 154a and the second set of elongate electrodes 154b forms a capacitor. More generally, each pair of at least one of the first set of elongate electrodes 154a and at least one of the second set of elongate electrodes 154b, which may or may not overlap with the at least one of the first set of elongate electrodes 154a, forms a capacitor. When an object, such as a finger, is placed on or proximate to one of these capacitors, a portion of the electric field lines extending from that capacitor is drawn toward the finger, to thereby cause a decreasing change in capacitance of the capacitor. Such change in capacitance is reflected in a signal outputted from one of the second set of elongate electrodes 154b that is forming the capacitor. Thus, the controller 152 can determine the position of the proximate object based on which one of the first set of elongate electrodes 154a is receiving a driving signal (e.g., Y coordinate) and which one of the second set of elongate electrodes 154b is outputting a signal indicative of a capacitance change (e.g., X coordinate). Again, this is one example of a capacitive touch sensing technique, and various other techniques for capacitive touch detection may be used in the touch mode operation of the present invention.

Figure 3A:
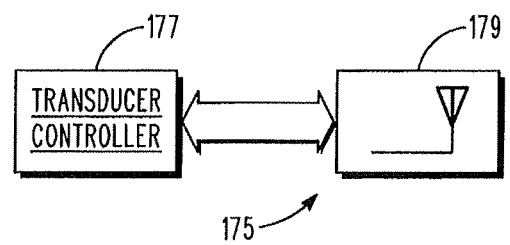
FIGS. 3A and 3B are schematic representations of a transducer for use in a combination touch and transducer input system, in accordance with an embodiment of the invention.
Figure 3B:
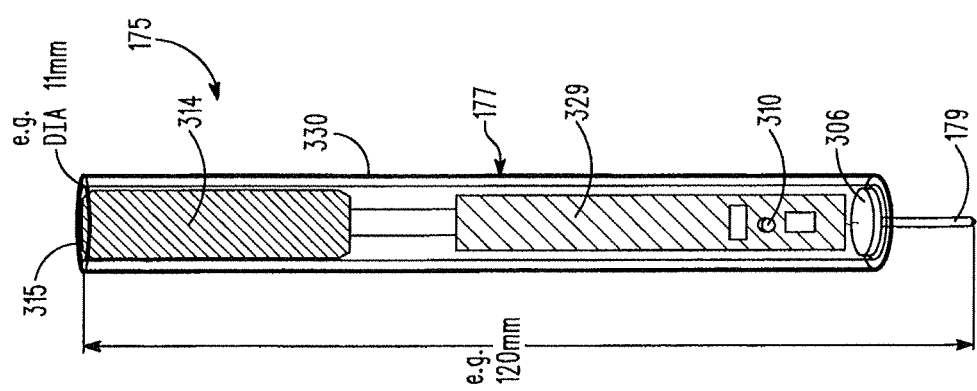

FIG. 3A is a simplified block diagram of a transducer 175 for use in a combination touch and transducer input system according to an embodiment of the present invention. The transducer 175 includes a transducer controller 177 and an antenna 179. FIG. 3B is a partially cross-sectional view of a transducer 175 embodied as a stylus according to one embodiment of the present invention. The stylus transducer 175 includes a generally cylindrical elongate body 330, which houses the transducer controller 177 (see FIG. 4), and an antenna 179 embodied as a pen tip of the stylus transducer 175. The transducer shown in FIG. 3B is suitable for use in electrically (or capacitively) coupling the antenna 179 and the array of electrodes 154, using the electric field generated by the transducer 175. The following description is generally related to these embodiments in which a transducer and a sensor are electrically (or capacitively) coupled. In other embodiments of the present invention, however, a transducer and a sensor may be magnetically coupled, using the magnetic field component of an electromagnetic field generated by the transducer, as will be described later in reference to FIG. 11D.

The transducer controller 177 controls the operation of the transducer 175 and, as will be more fully described below in reference to FIG. 4, may suitably comprise any type of processing device, including single integrated circuits such as a microprocessor. Additionally, the transducer controller 177 may include multiple separate devices, including any suitable number of integrated circuit devices and/or circuit boards working in cooperation. For example, the transducer controller 177 may include devices such as pressure sensors, switches, capacitors, regulators, microcontrollers and processors.

The transducer controller 177 regulates the emitting of an electric field from the antenna 179. When the transducer 175 is proximate the array of electrodes 154, the electric field emitted by the antenna 179 will induce sensing signals in one or more electrodes. Specifically, by applying a voltage V to the transducer antenna 179, an amount of charge Q is stored on the transducer antenna 179 that effectively forms a top plate of a capacitor, and an electric field is established between the transducer antenna 179 and one or more of the array of electrodes 154 that effectively form a bottom plate of the capacitor. This electric field induces an opposing charge on the one or more of the array of electrodes 154, wherein the amount of charge induced is proportional to the capacitance between the transducer antenna 179 and the one or more electrodes. The induced charge is independent of the frequency at which the voltage V is applied, and is generally expressed as below:

$$Q=CV \qquad \text{Equation (1)}$$

where C is the capacitance between the transducer antenna 179 and the one or more electrodes on which the charge is induced. By varying the voltage applied to the transducer antenna 179, a current can be induced on the array of electrodes 154. Specifically, varying the applied voltage will change the stored charge and the electric field, thereby changing the induced charge on the array of electrodes 154. Changes in the induced charge result in a current flow (I) in the array of electrodes 154, which is proportional to the applied driving frequency as well as the voltage V and the capacitance C.

$$I = C\frac{dV}{dt} \qquad \text{Equation (2)}$$

According to various exemplary embodiments of the present invention, the current flow, or more particularly, attributes (e.g., amplitudes, phases, etc.) of the currents (sensing signals) induced in the array of electrodes 154 are measured and used to determine the position of the transducer 175. In other words, when operating in the transducer mode, the sensor controller 152 is configured to determine a position of the transducer 175 based on the attributes of a plurality of sensing signals that are induced in the array of electrodes 154.

Figure 4:
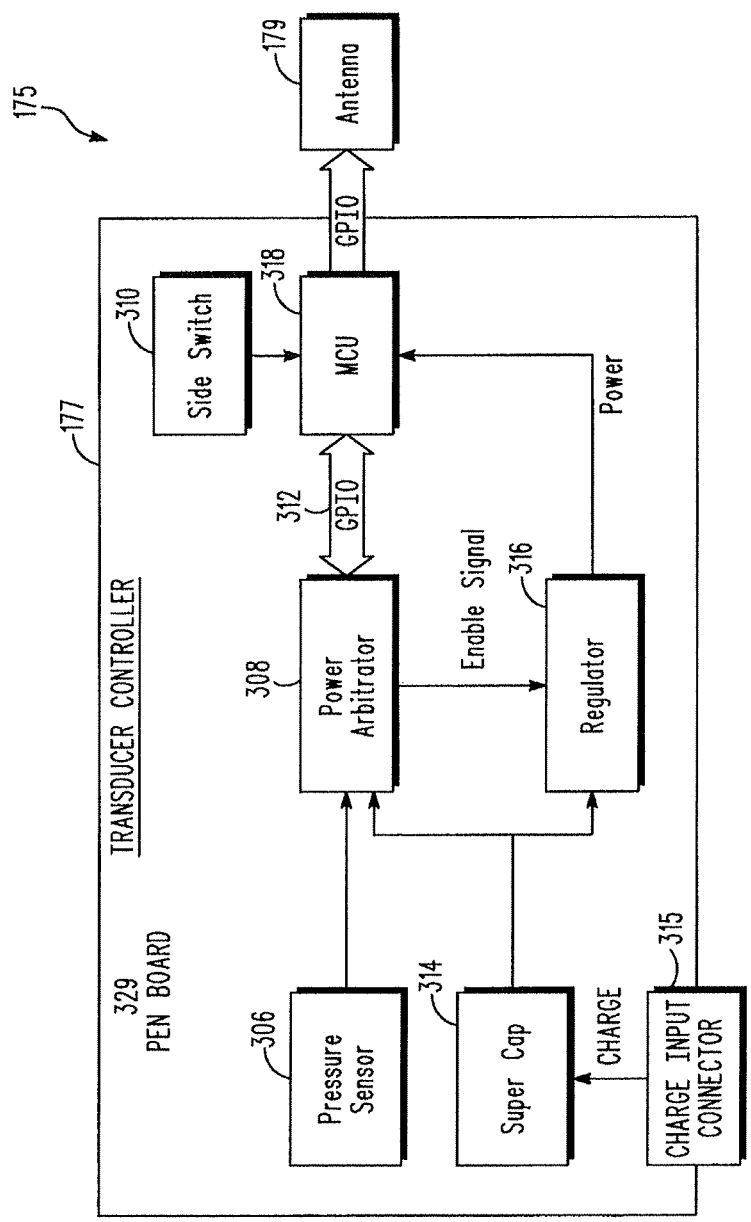
FIG. 4 is a block diagram of a transducer in accordance with an embodiment of the invention.

FIG. 4 is a block diagram of the transducer 175 according to one embodiment of the invention. The transducer 175 includes a transducer controller 177 and an antenna 179. The transducer controller 177 controls the operation of the transducer 175 and may suitably comprise any type of processing device. In the illustrated embodiment, the transducer controller 177 includes a pressure sensor 306, a power arbitrator 308, a side switch 310, a capacitor 314 (e.g., a super capacitor), a charge input connecter 315, a regulator 316, and a microcontroller unit (MCU) 318. The power arbitrator 308 and the MCU 318 are coupled via a general purpose input/output (GPIO) 312, and the MCU 318 and the antenna 179 are coupled via another GPIO.

Referring additionally to FIG. 3B, some or all of these components of the transducer controller 177 and their required interfaces may be mounted on an appropriately sized circuit board 329, which is then housed within an appropriate transducer body 330. In the stylus implementation shown in FIG. 3B, all components except for the capacitor 314 are mounted on the board 329 inside the pen-shaped body 330. In the embodiment shown in FIG. 3B, the pressure sensor 306 is provided near the tip of the stylus so as to detect a pressure applied to the tip formed by the antenna 179 when the tip is applied against the sensing surface. In other embodiments, though, the pressure sensor 306 may be placed further away from the tip via a mechanism or linkage that transmits the pressure information from the tip to the location of the pressure sensor 306. The side switch 310 is provided to be exposed on the side of the pen-shaped body 330. The capacitor 314, such as a super capacitor, is provided in the rear portion of the pen-shaped body 330, with the charge input connector 315 being exposed on the rear end of the pen-shaped body 330 to be connected to a charging docking station (not shown). The antenna 179, which functions as a pen tip for the stylus transducer 175 of FIG. 3B, may be configured of any suitable conductive material and may be formed in any suitable shape. In one embodiment, the stylus illustrated in FIG. 3B has a length of 120 mm and a diameter of 11 mm, although the dimensions of the stylus transducer are not so limited according to the present invention.

In the illustrated embodiment, the capacitor 314 is provided to function as a power source for the transducer 175. Any capacitor, such as a super capacitor having a high energy density, to provide enough power to operate the transducer 175 for a sufficient length of time may be used. For example, a 0.2 F capacitor with a rated voltage of 3.3V will be able to provide sufficient power in most applications. As seen in FIG. 3B, the diameter of the capacitor 314 may define the diameter of the stylus-type transducer 175 and, therefore, by reducing the diameter of the capacitor 314, the diameter of the transducer 175 may be made smaller to be in the range of 3-7 mm.

The capacitor 314 can be charged from a variety of sources. For example, as illustrated, it may be charged via the charge input connector 315 when the transducer 175 is placed in a docking station or other storage area of an associated device (not shown). When the transducer 175 is placed in the docking station, power is transmitted through an ohmic contact or from an antenna of the docking station to the transducer 175 and more specifically to the capacitor 314. In another embodiment, the capacitor 314 may be charged by receiving an electromagnetic signal from the array of electrodes 154 or from powering antennas provided separately from the array of electrodes for this purpose. The powering antenna may be located on or near the array of electrodes 154. To receive such an electromagnetic signal, the transducer 175 may use the antenna 179 or a separate antenna that is provided specifically for this purpose. In these embodiments, the transducer 175 can be recharged during use, and therefore a smaller capacitor 314 may be used. It should be noted that the capacitor 314 is one example of a power source suitable for use with the transducer 175, and other types of power sources may likewise be used, such as a battery and a corded power supply.

The pressure sensor 306 is used to detect pressure applied to the transducer 175 and, more specifically, to the tip of the transducer in case of a stylus-form transducer. The detected pressure is then used to control various operations of the transducer 175 and the combination touch and transducer input system. In the illustrated embodiment, the pressure sensor 306 is mounted at the tip of a pen-like transducer such that the pressure sensor 306 can measure the pressure at which the tip is applied to the sensing surface 104. As one example, the detected pressure is used to "awaken" the transducer 175 from a default sleep mode. By providing a sleep mode, and awaking the transducer 175 only when tip pressure is detected, the operating time of the transducer 175 can be reduced to thereby conserve power. As another example, the pressure sensor 306 can be used to force the combination touch and transducer input system to remain operating in the transducer mode as long as a pressure value above a certain threshold is detected, instead of switching to operating in the touch mode. As a further example, the pressure sensor 306 can be used to indicate the width or darkness of a user's stroke, such as a smaller pressure indicating a thin or light stroke, or a larger pressure indicating a wide or dark stroke desired by the user. A variety of different types of circuits can be used to implement the pressure sensor 306. As one example, a variable resistor that changes resistance as pressure is applied can be used. The change in resistance is measured and digitized by an appropriate analog-to-digital converter (ADC), and then transmitted to the MCU 318 for processing to determine the detected pressure level.

The side switch 310 is a switch that allows a user to control operation of the transducer 175, similar to the right- and left-clicking of a mouse, for example. The state of the side switch 310 is passed to the MCU 318 and used in controlling the operation of the transducer 175. For example, it can be used to put the transducer 175 into different operating modes, such as in different colors or in different types of stroke. As with the pressure information obtained by the pressure sensor 306, the switch information received from the side switch 310, as well as the transducer ID information, may be then encoded as digital data by the MCU 318, for transmission from the antenna 179 to the array of electrodes 154, as will be more fully described below.

The regulator 316 provides power regulation for the transducer 175, and in particular provides a regulated power supply for the MCU 318. Especially in cordless transducer applications powered by the capacitor 314 or a battery, it is desirable to minimize power consumption. Thus, the power regulator 316 preferably provides a sleep or shut-down mode with low current draw, in addition to an awake mode with regular current draw. In this connection, the power arbitrator 308 monitors a pressure signal received from the pressure sensor 306 and, when the detected pressure level exceeds a certain threshold value as determined by the MCU 318, may enable the regulator 316 to switch from the sleep mode to the awake mode to awaken the transducer 175. Substantial power saving is possible with awaking the transducer 175 only when sufficient tip pressure is detected. A variety of different types of power regulators can be used, including various programmable devices with controllable output levels. The operation of the transducer 175 to switch between the sleep mode and the awake mode will be described below in reference to FIG. 15.

According to some exemplary embodiments of the present invention, the microcontroller unit (MCU) 318 carries out the overall processing for the transducer 175 and performs generally three functions: controlling the regulator 316 via the power arbitrator 308, providing a driving signal for the antenna 179, and hopping the driving signal frequency to provide noise immunity and/or to encode digital data in the driving signal. In accordance with various exemplary embodiments of the invention, the MCU 318 is a programmable device that includes an onboard digitally controlled oscillator. The digitally controlled oscillator provides a driving signal for the antenna 179. The oscillator can be controlled to provide a range of different frequencies to achieve frequency hopping and to encode digital data (e.g., pressure data, switch status data, and pen ID data) in frequency shifts of the driving signal for the antenna 179. In further embodiments, the MCU 318 is configured to encode digital data in amplitude shifts or phase shifts of the driving signal for the antenna 179. The MCU 318 controls the timing, durations, frequencies, amplitudes, and phases of driving signals for the antenna 179. Therefore, the electric field generated by the antenna 179 is used by the sensor 150 not only to determine a position of the transducer 175, but also to receive and decode the digital data encoded therein by the transducer 175. The MCU 318 preferably provides a low power mode which reduces operating current. The lower power mode can be used between transmission times to reduce overall power consumption. One example of a microcontroller unit with low power consumption suitable for use as the MCU 318 is a MSP430 microcontroller available from Texas Instruments.

Figure 5A:
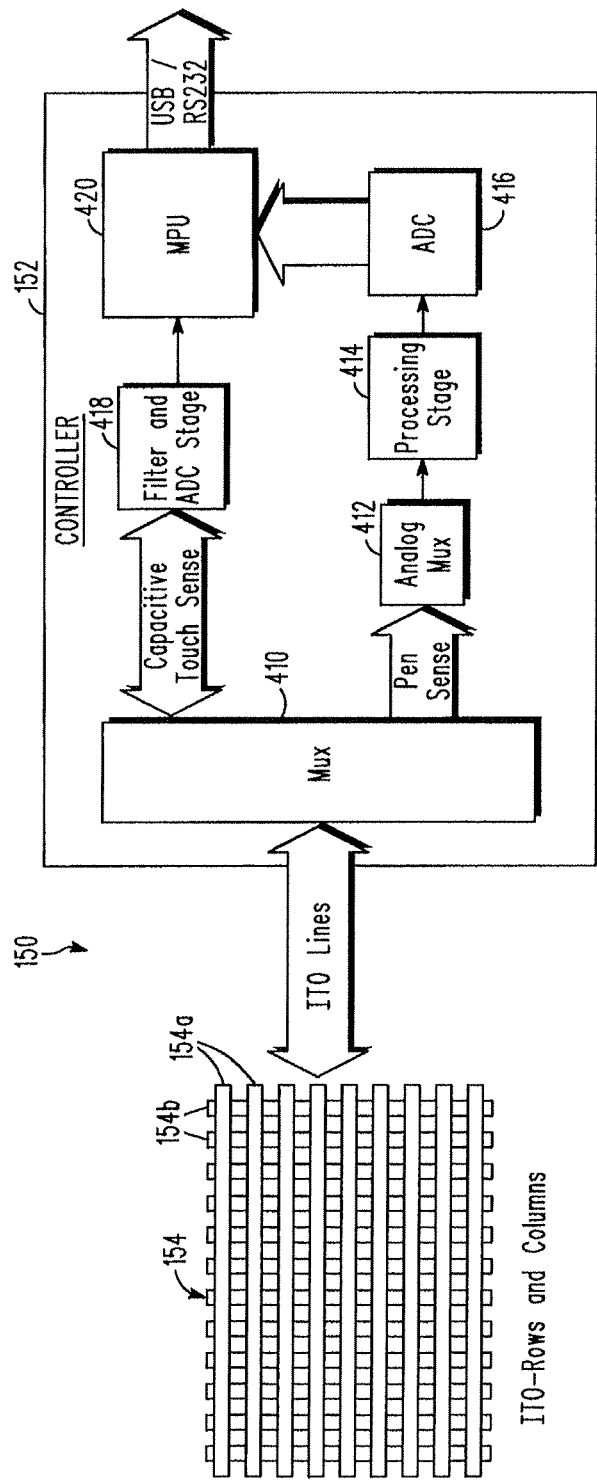
FIG. 5A is a block diagram of a sensor, including a controller and an array of electrodes, in accordance with an embodiment of the invention.

FIG. 5A is a block diagram of the sensor 150 including the array of electrodes 154 and the controller 152 (see FIG. 2). The controller 152 functions to perform signal processing for position determination of an object (e.g., a finger) and the transducer 175, as well as for decoding digital data encoded in the electric field generated by the transducer 175. In the illustrated embodiment, the controller 152 includes an analog multiplexer (Mux) 410, another analog multiplexer 412, a processing stage 414, an analog-to-digital converter (ADC) 416, and a microprocessor unit (MPU) 420, which generally form the transducer's position and digital data sensing portion of the controller 152. The controller 152 also includes a filter and analog-to-digital converter (ADC) 418 which together with the multiplexer 410 and the MPU 420 form the capacitive touch sensing portion of the controller 152. One example of a microprocessor unit suitable for use as the MPU 420 is a programmable system-on-chip (PSOC) microprocessor available from Cypress. It should be noted that the configuration of the controller 152 as illustrated in FIG. 5A is merely one example, and other configurations of the controller 152 are possible as should be apparent to one skilled in the art. For example, the capacitive touch sensing portion and the transducer's position and digital data sensing portion can be partially or fully combined and integrated together. In the illustrated embodiment, the MPU 420 is shared by both the capacitive sensing portion and the transducer's position and digital data sensing portion.

The multiplexer 410 selectively couples the array of electrodes 154 to the capacitive touch sensing portion and/or to the transducer's position and digital data sensing portion of the controller 152 depending on the operational mode of the system. The multiplexer 410 can be implemented with suitable analog multiplexers. These multiplexers are preferably selected to have relatively low charge injection so as not to significantly disturb the capacitance of the array of electrodes 154. The multiplexer 410 is coupled to the analog multiplexer 412 in the transducer's position and digital data sensing portion, and to the filter and ADC 418 in the capacitive sensing portion.

In the capacitive sensing portion, the filter and ADC 418 is configured to suitably amplify, filter, and digitize the received signals, which the MPU 420 processes to measure any capacitance change caused by object(s) to thereby determine the position of the object(s). To this end, for example, the MPU 420 may drive an electric signal to each of the first set of elongate electrodes 154a, which forms a capacitor with each of the second set of elongate electrodes 154b, and any change in capacitance at each capacitor is monitored and measured through the corresponding one of the second set of electrodes 154b. The MPU 420 performs the processing necessary to determine the position of the object(s) based on the measured capacitance change. It should be noted that a wide variety of different techniques could be used to facilitate capacitive sensing, and the embodiments of the invention can be implemented with any suitable capacitive sensing technique. According to one aspect of the present invention, a combination touch and transducer input system may be advantageously constructed from any suitable capacitive touch sensor, to which the transducer's position and digital data sensing function can be added.

The analog multiplexer 412 in the transducer's position and digital data sensing portion serves to connect individual electrodes in the array of electrodes 154 to the processing stage 414 during the transducer mode. When the electrodes are not coupled to the processing stage 414, they are selectively terminated (e.g., grounded, terminated through a resistor to ground, or floated), as will be more fully described below in reference to FIGS. 11B and 11C.

The processing stage 414 functions to amplify and filter the sensing signals received from the array of electrodes 154. The processing stage 414 can thus include a variety of amplifiers and filters. An example of the processing stage 414 will be described in detail below in reference to FIG. 6. The amplified and filtered signals in analog form are then received by the ADC 416 and outputted therefrom in digital form to the MPU 420.

Turning to FIG. 6, one specific embodiment of a processing stage 414 is illustrated. In this embodiment, the processing stage 414 includes an amplifier 502, an automatic gain control (AGC) 504, a notch filter 506, a bandpass filter 508 (e.g., a wideband bandpass filter), and an anti-aliasing filter 510.

The amplifier 502 amplifies the signal received from the selected electrode. Various types of amplifiers may be used, including a charge amplifier, a voltage amplifier, a transimpedance amplifier, and a cascoded transimpedance amplifier.

FIG. 7 illustrates an exemplary charge amplifier 600, which may be used as the amplifier 502 of FIG. 6. The charge amplifier 600 includes an operational amplifier (or "op amp") 602 set up with negative feedback through a capacitor 606. The inverting input of the op amp 602 is connected to the electrode line. The charge amplifier 600 generates a voltage proportional to the charge induced on the electrode, and this voltage is given by:

$$V = \frac{Q}{C} \qquad \text{Equation (3)}$$

where V is the outputted voltage, Q is the charge induced on the electrode, and C is the feedback capacitance 606. Since any operational amplifier suffers from input and offset bias currents at its inverting and non-inverting terminals, the charge amplifier of FIG. 7 should include a DC path for these currents to flow. For example, a resistor 607 can be included in parallel with the feedback capacitor 606, to thereby create a DC path that allows the inverting terminal's bias currents to flow without compromising the characteristics of the charge amplifier as set by the feedback capacitor 606. This design differs from the transimpedance amplifier in the cascoded transimpedance amplifier of FIG. 10, to be described below, wherein the feedback resistor 904 is sized in relation to the feedback capacitor 906 so that the impedance of the resistor 904 dominates in the feedback loop over the impedance of the capacitor 906. The appropriate values of the feedback resistors and capacitors as used in FIGS. 7 and 10 will be readily determinable by those skilled in the art.

FIG. 8 illustrates an exemplary voltage amplifier 700, which may be used as the amplifier 502 of FIG. 6. The voltage amplifier 700 includes an op amp 702 and resistors 704 and 706. The electrode line is connected to the resistor 706.

FIG. 9 illustrates an exemplary transimpedance amplifier 800, which may be used as the amplifier 502 of FIG. 6. The transimpedance amplifier 800 includes an op amp 802 and a resistor 804. The inverting input of the op amp 802 is connected to the electrode line. A current flowing through the feedback resistor 804 surrounding the op amp 802 is converted to a voltage.

FIG. 10 illustrates an exemplary cascoded transimpedance amplifier 900, which may be used as the amplifier 502 of FIG. 6. The cascoded transimpedance amplifier 900 includes an op amp 902, a resistor 904, a capacitor 906, two constant current sources 908, 909, and a transistor, such as an NPN transistor 910. The cascoded transimpedance amplifier 900 works similarly to the transimpedance amplifier 800 of FIG. 9, in that any current flowing through the feedback resistor 904 surrounding the op amp 902 will be converted to a voltage, as follows:

$$V = IR \qquad \text{Equation (4)}$$

where V is the outputted voltage, I is the current flowing through the feedback resistor 904, and R is the resistance of the feedback resistor 904. The cascoded transimpedance amplifier 900 is advantageous in that it isolates the input capacitance of the electrode line from the feedback resistor 904 of the transimpedance amplifier 900 with the NPN transistor 910, allowing higher transimpedance gains to be realized without sacrificing bandwidth or signal to noise ratio. It also has improved stability by incorporating the feedback capacitor 906 in parallel with the feedback resistor 904 to control the noise gain at higher frequencies.

This combination of the transistor 910 in front of a transimpedance amplifier is known as a cascoded transimpedance amplifier. The NPN transistor 910 is configured as a common-base current buffer and, as such, allows a current flowing into its emitter (E) to flow through the transistor 910 and out to its collector (C). The current is then picked up by the transimpedance amplifier and converted to a voltage signal. The NPN transistor emitter (E) has an equivalent small signal resistance that is given by:

$$r = \frac{kT}{qIc} \qquad \text{Equation (5)}$$

where k is Boltzman's constant, T is temperature, q is the elementary unit of charge, and Ic is the bias current flowing through the NPN transistor. The resistance r is seen by the electrode capacitance and creates a RC constant that can limit the bandwidth of the transimpedance amplifier. Thus, two equal constant current sources 908, 909 are included in this design to establish an appropriate bias current so that the emitter resistance r is set small enough to allow the signal picked up by the electrode to pass through to the transimpedance amplifier. In another embodiment, one constant current source may be used to achieve the same effect, although with only one current source the bias current may have no other way but to flow through the transimpedance amplifier. This will cause a large DC offset to be detected which, with sufficient gain, will saturate the transimpedance amplifier and wipe out the desired signal. Using two matched constant current sources 908, 909, as illustrated, ensures that the bias current injected into the NPN transistors 900 is also picked up and drawn away from the transimpedance amplifier.

Returning to FIG. 6, the amplified signal from the amplifier 502 is passed to the automatic gain control (AGC) 504. Using feedback from the MPU 420, the AGC 504 automatically scales the output of the amplifier 502. The AGC 504 is adjusted so that the dynamic range of the signal eventually fed into the ADC 416 closely matches its full scale reference. This can reduce digitization noise that could otherwise result when weaker signals are received by the array of electrodes 154.

The output of the AGC 504 is passed to the notch filter 506. The notch filter 506 is provided to remove noise spikes, such as those caused by powerline noise that is picked up by the array of electrodes 154. Suitably, a 50/60 Hz notch filter can be used to remove typical power line noise.

The output of the notch filter 506 is passed to the bandpass filter 508, such as a wideband bandpass filter. The bandpass filter 508 is provided to pass only the selected range of predefined frequencies while blocking or removing other frequencies.

The output of the bandpass filter 508 is passed to the anti-aliasing filter 510. The anti-aliasing filter 510 is a filter to reduce noise above a certain frequency to match the output signal to the ADC 416, to ensure that the ADC sampling is not aliased or distorted. The anti-aliasing filter 510 is typically implemented with a filter having a very sharp cut-off frequency.

The processing stage 414, as illustrated in FIG. 6, thus amplifies and filters the signals induced in and received from the array of electrodes 154. Returning to FIG. 5A, the output of the processing stage 414 is passed to the analog to digital converter (ADC) 416. The ADC 416 digitizes the analog output of the processing stage 414. In one embodiment, the ADC 416 has a sample rate of 1 million samples per second. This provides a sufficient sampling rate to avoid aliasing when the transducer 175 transmits at frequencies up to 250 kHz.

The digitized output of the ADC 416 is passed to the MPU 420. The MPU 420 performs the processing for determining the position of the transducer 175 based on the received signals, as well as for decoding digital data (e.g., pressure data, switch status data, and pen ID data) encoded in the received signals. Exemplary processes used to encode digital data in the transducer signal, and to scan and decode the transducer signal both to determine a position of the transducer and to decode the digital data, will be described later in reference to FIGS. 11A-16.

In various other embodiments of the present invention, the transducer 175 may transmit digital data (e.g., pressure data, switch status data, and pen ID data) to the sensor 150 using other RF techniques such as via a Bluetooth® device pursuant to IEEE 802.15 standards including Bluetooth and ZigBee protocols.

As described above, the combination touch and transducer input system may be configured to operate in a touch sensing mode and in a transducer sensing mode in an alternating manner by switching between the two modes in successive sampling periods. To this end, the controller 152 and, more specifically the MPU 420, is configured to control the multiplexer 410 so as to perform the touch sensing and transducer sensing in an alternating manner. In another embodiment, the operating mode may be selected by a user of the system. For example, the sensor 150 may include a switch, which the user may operate to select one of the two modes. As another embodiment, the system operating in the transducer mode may remain operating in the transducer mode as long as it is receiving digital data from the transducer 175 indicating that a pen pressure above a certain threshold value has been detected. As discussed above, the pressure sensor 306 may be used to sense the stylus-type transducer's tip pressure to thereby awaken the transducer only upon detecting a pen pressure exceeding a threshold value. At that time, either the pressure value, or the awake mode, may be sent from the transducer 175 to the sensor 150. For example, the digital data may be encoded in the electric field generated by the transducer 175 and transmitted to the sensor 150. Upon receiving (and decoding, if necessary) the digital data indicative of a pen pressure above a threshold value, during the transducer mode, the controller 152 may reset its timer to automatically remain operating in the transducer mode for a predetermined amount of time, without switching to the touch mode.

Figure 5B:
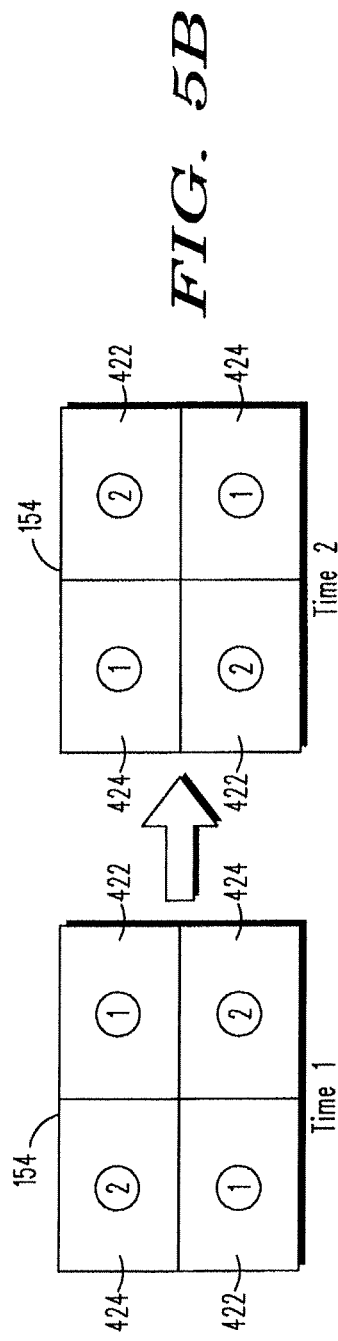
FIG. 5B is a schematic representation of an array of electrodes that is divided into one or more touch mode sections and one or more transducer mode sections, according to one embodiment of the invention.

Referring now to FIG. 5B, in some embodiments of the invention, the array of electrodes 154 is divided into a touch mode section, denoted by ①, and a transducer mode section, denoted by ②. The controller 152 is configured to simultaneously operate in the touch mode in the touch mode section ① and in the transducer mode in the transducer mode section ②. To this end, the array of electrodes 154 needs to be suitably reconfigured, as well as its connection with the multiplexer 410. In the illustrated embodiment, the array of electrodes 154 is divided into four quadrants, two quadrants 422 forming the touch mode section ① and the other two quadrants 424 forming the transducer mode section ②, at Time 1. The controller 152 may be further configured to selectively switch the touch mode section ① and the transducer mode section ② so that a given point on the array of electrodes 154 alternates between being in the touch mode section and being in the transducer mode section. For example, in FIG. 5B, at Time 2, the touch mode section and the transducer mode section are switched, such that the two quadrants 422 that previously formed the touch mode section now form the transducer mode section ②, while the other quadrants 424 that previously formed the transducer mode section now form the touch mode section ①. By alternating between the state of Time 1 and the state of Time 2, the controller 152 can simultaneously operate both in the touch mode and in the transducer mode, and further, any point on the array of electrodes 154 alternates between being in the touch mode section and being in the transducer mode section. While in the illustrated embodiment the touch and transducer mode section each consists of two quadrants, each mode section may instead consist of one section or of three or more sub-sections. Also, the shape of each section and sub-section, as well as the pattern in which multiple sections and sub-sections are combined, are not limited to what is illustrated in FIG. 5B. For example, each section or sub-section may have an elongate shape and be arranged generally in parallel with each other to form stripes.

Figure 11A:
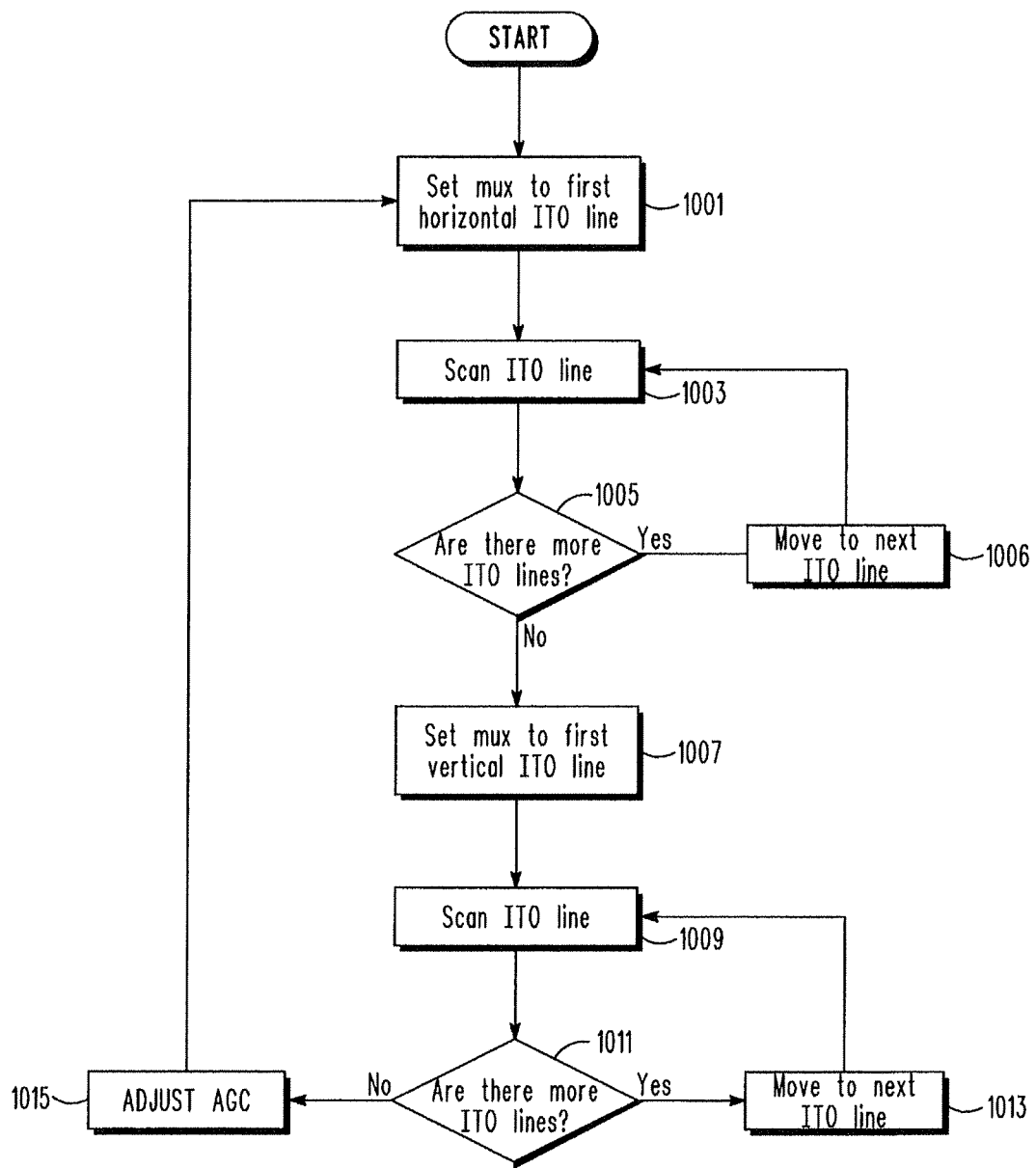
FIG. 11A is a flow chart illustrating a process of scanning an array of electrodes during a transducer mode, according to one embodiment of the invention.

FIG. 11A is a flow chart illustrating one example of a process performed by the sensor controller 152 to scan the signals from the array of electrodes 154 during the transducer mode. In step 1001, the multiplexers 410, 412 are set to receive a signal from the first horizontal ITO line, e.g., the first Y electrode. In step 1003, the selected horizontal ITO line is scanned. In step 1005, it is determined whether there are more horizontal ITO lines to be scanned. If yes, in step 1006 the next horizontal ITO line is selected, and returning to step 1003, the selected next horizontal ITO line is scanned. If in step 1005 it is determined that no more horizontal ITO lines exist, in step 1007, the multiplexers 410, 412 are set to receive a signal from the first vertical ITO line, e.g., the first X electrode. In step 1009, the selected vertical ITO line is scanned. In step 1011, it is determined whether there are more vertical ITO lines to be scanned. If yes, in step 1013 the next vertical ITO line is selected, and returning to step 1009, the selected next vertical ITO line is scanned. If in step 1011 it is determined that no more vertical ITO lines exist, i.e., if it is determined that the entire array of electrodes 154 has been scanned, proceeding to step 1015, feedback from the scanned data is used to adjust the gain of the AGC 504 in the processing stage 414 of the controller 152. In accordance with various exemplary embodiments of the present invention, the process of FIG. 11A runs concurrently with other software run by the MPU 420. This ensures that there is a constant stream of signal samples coming in from the array of electrodes 154.

Figure 11C:
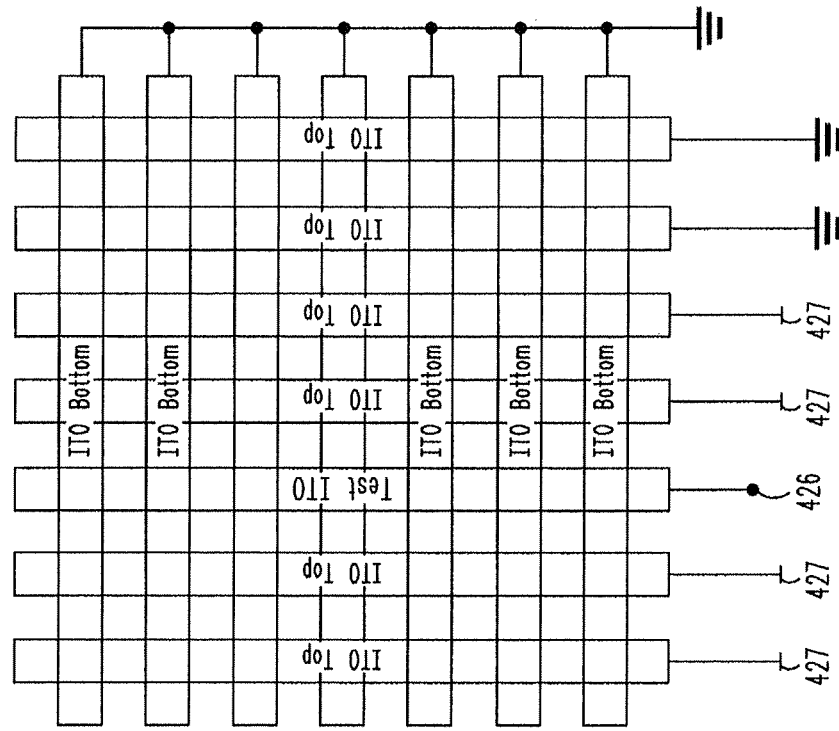
FIGS. 11B and 11C each illustrate an array of electrodes, in which when one elongate electrode is sensed during a transducer mode using the electric field coupling, two or more of the elongate electrodes adjacent to the electrode being sensed are selectively terminated (e.g., floated, terminated via a resistor to ground, or grounded) according to one embodiment of the invention.
Figure 11B:
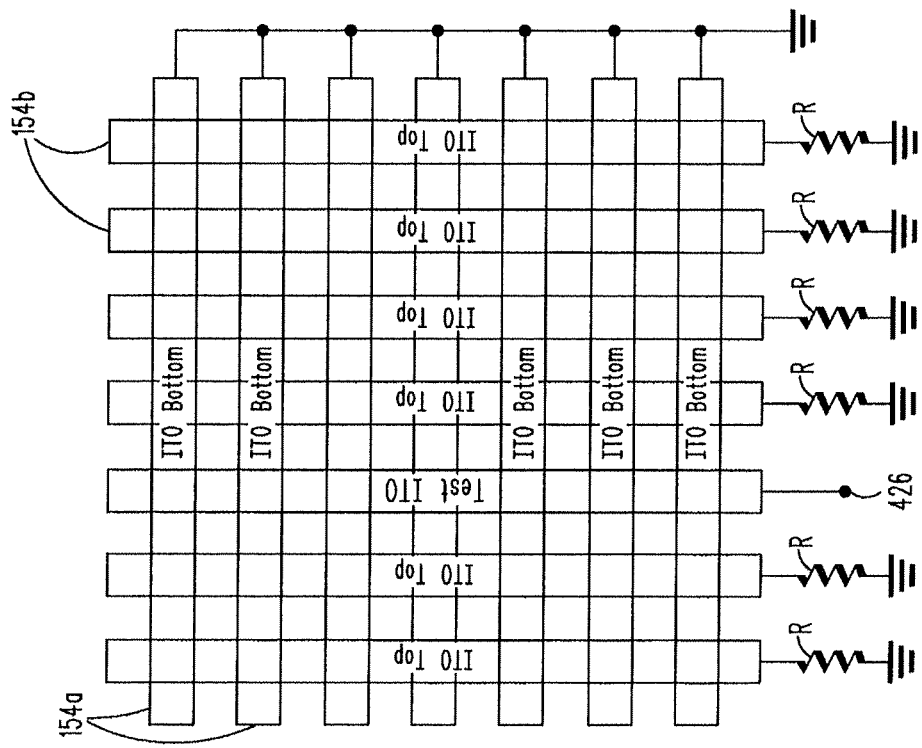

Referring to FIGS. 11B and 11C, during the electrode scanning as described above in reference to FIG. 11A, it has been discovered that selectively terminating the electrodes adjacent to the electrode being sensed improves the capacitive response of the sensed electrode to thereby produce a stable signal with improved signal-to-noise ratio. Specifically, FIG. 11B shows one of the second set of elongate electrodes 426 being sensed, while the adjacent electrodes in the second set of elongate electrodes 154b are all terminated via a resistor R to ground. The first set of elongate electrodes 154a are all grounded. As used herein, "selectively terminated" means any of the selected states including being grounded (zero or low impedance), being floated (i.e., not significantly constrained in its voltage relationship to ground, with high or infinite impedance), and being terminated via an impedance to ground, i.e., via a resistor or another electronic device (having a selected value of impedance) to ground.

In the example of FIG. 11B, all of the adjacent electrodes in the second set of elongate electrodes 154b are terminated via a resistor "R," although in other embodiments only two or more of the adjacent electrodes may be terminated via a resistor (or floated, or grounded). For example, FIG. 11C shows another exemplary embodiment according to the present invention, in which one of the second set of elongate electrodes 426 is sensed, while two adjacent electrodes 427 on either side of the electrode 426 (total four adjacent electrodes 427) are floated. The remaining electrodes are grounded. In this embodiment, these adjacent electrodes 427 are not coupled to ground even via another device such as a resistor. As another example, three or four adjacent electrodes on either side of the electrode 426 may be floated, or terminated via a resistor, with the rest of the electrodes being grounded. Contrary to conventional wisdom that not grounding all of the adjacent electrodes will trigger cross-coupling among adjacent electrodes, in some applications, floating or terminating via a resistor the adjacent electrodes surprisingly improves capacitive coupling between the transducer 175 and the electrode being sensed 426.

In other applications, on the other hand, grounding all of the adjacent electrodes will reduce capacitive coupling among adjacent electrodes to thereby improve the capacitive response of the electrode being sensed. This may be true, for example, when high-frequency signals are used or when the electrodes are very thin and have a width on the order of 1 mm and are finely spaced. A suitable manner of selective termination (e.g., how many of the adjacent electrodes should be floated, terminated via a resister, or grounded) can be derived for a particular electrode configuration pattern based on a simulation method. As a specific example, it has been found that changing the impedance through which each electrode is terminated, from zero (grounded) to a certain impedance value (through a resistor) to infinity (floated), in turn controls the width of a signal response as illustrated in FIG. 13B below. Controlling and optimizing this width will be advantageous in performing a curve fitting procedure, also described below, to determine the transducer's position.

Figure 11D:
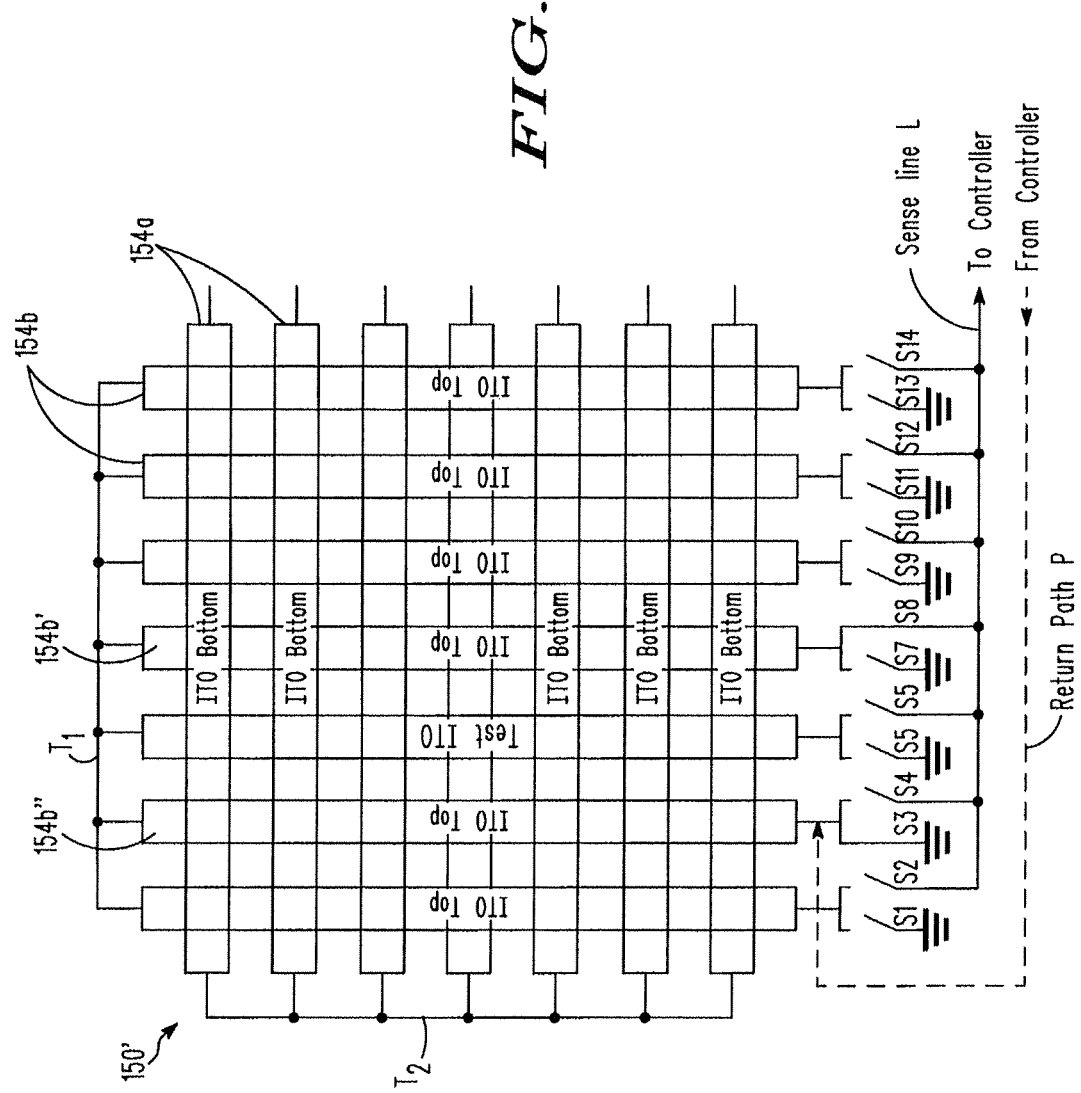
FIG. 11D illustrates an array of electrodes suitably arranged to pick up a magnetic field component of an electromagnetic field generated by a transducer, during the transducer mode, in accordance with one embodiment of the present invention.

While the description above generally relates to various embodiments of the present invention in which the transducer 175 and the sensor 150 are electrically (capacitively) coupled based on the electric field generated by the transducer 175, in other embodiments they can be magnetically coupled based on the magnetic field component of an electromagnetic field generated by the transducer 175. FIG. 11D illustrates a sample configuration of a sensor 150' suitable for use in a magnetic coupling embodiment. In FIG. 11D, the second set of (vertical) electrodes 154b have one side of each shorted together through a trace "$T_1$" while the other side of each is connected to switches $S_1$-$S_{14}$, so that any of the second set of electrodes 154b may be connected to ground or to a sense line L connected to the controller 152 (not shown). In the illustrated example, only one electrode 154b' is connected to the sense line L at a time, though in other examples two or more of the second set of electrodes 154b or of the first set of electrodes 154a may be simultaneously connected to the sense line L. While FIG. 11D shows switches $S_1$-$S_{14}$ for the second set of electrodes 154b only, it should be understood that a similar set of switches are also connected to the first set of electrodes 154a.

As illustrated, with switches $S_3$ and $S_8$ closed, a loop is formed that is enclosed by the second and the fourth (from the left) electrodes 154b" and 154b', the section of the trace "$T_1$" connecting these two electrodes, the sense line L (to the controller 152), and a return path P (from the controller 152) through ground that the signal must take to arrive back at the grounded electrode 154b". Any magnetic flux that flows through the area enclosed by this loop will produce an electromotive force, which can be interpreted as a current source or a voltage source connected in series with the loop. By connecting the loop to a voltage amplifier (such as the one shown in FIG. 8) or a transimpedance amplifier (such as those shown in FIGS. 9 and 10), a signal induced in the loop by a magnetic transducer can be detected. Based on the detection of such signals across a number of loops, respectively, the position of the magnetic transducer can be calculated and determined. The magnetic transducer is configured similarly to the transducer shown in FIG. 3B, except that it will have a loop (or coil) antenna capable of producing a stronger magnetic field as compared to the generally pin-shaped antenna 179 of FIG. 3B.

It should be noted that, while in FIGS. 11B, 11C and 11D, the first set of electrodes 154a are denoted as "ITO Bottom" and the second set of electrodes 154b are denoted as "ITO Top," the top and bottom orientation of the electrodes is not so limited according to the present invention.

As described above in reference to FIGS. 5A and 6, the signals sequentially selected by the multiplexers 410, 412 are then amplified by the amplifier 502, scaled by the AGC 504, filtered by the notch filter 506, the bandpass filter 508, and the anti-aliasing filter 510, and then converted into digital values by the ADC 416. Thereafter, according to various exemplary embodiments of the present invention, the MPU 420 is configured to perform filtering of the digital values received from the ADC 416. Alternatively, digital filtering may be implemented by a processor which is not part of MPU 420. Specifically, while the notch filter 506, the bandpass filter 508, and the anti-aliasing filter 510 substantially remove the noise, there may remain further noise that could be removed. Thus, the sensor controller 152 preferably uses a digital filtering technique, in the MPU 420 or in a separate processor, to remove this remaining noise from the digital values outputted from the ADC 416. Any suitable IIR (infinite impulse response) or FIR (finite impulse response) filters may be used.

Figure 12:
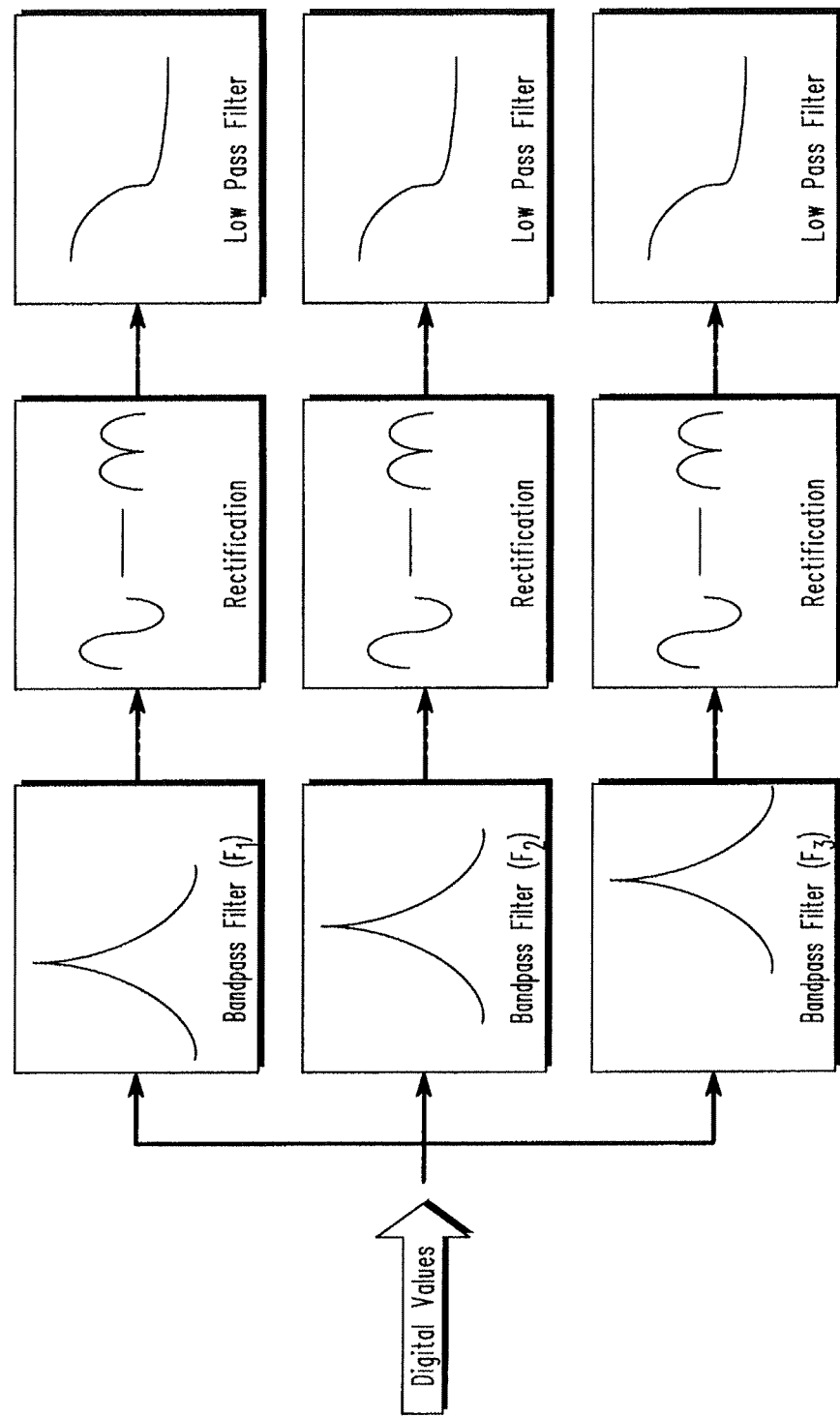
FIG. 12 is a schematic representation of a digital filtering procedure according to one embodiment of the invention.

Turning now to FIG. 12, an exemplary procedure for digital filtering is illustrated. The digital filtering procedure is preferably implemented as software run by the MPU 420, though it may be implemented in another processor. In the illustrated embodiment, the digital filtering procedure includes three channels of filtering. Each channel corresponds to one of multiple frequencies at which the electric field can be generated by the transducer 175. In the illustrated embodiment, the transducer 175 is configured to selectively transmit at any of three frequencies, and thus the digital filtering procedure includes three corresponding channels, though in other embodiments more frequency channels may be included. Each filtering channel includes a band pass filter having a different pass frequency ($F_1$, $F_2$, $F_3$,), a rectification stage, and a low pass filter. In general, the filter frequencies are selected to filter out noise from known nearby noise sources, such as the noise from a nearby LCD screen. The output of the three band pass filters is each rectified and passed to a corresponding low pass filter. The rectification and low pass filtering of the digital values filters out the remaining noise and extracts relevant attribute (e.g., amplitude, phase, etc.) information from the inputted digital values. The output of the digital filtering therefore provides an accurate basis for determining the position of the transducer 175 and for decoding digital data encoded in the signal received from the transducer 175.

In accordance with one aspect of the invention, two or more frequency channels are used for better noise rejection. For example, some LCD screens radiate sharp peaks at certain frequencies. If one of these frequencies is the same as the frequency used by the transducer 175, other frequencies also available to the transducer 175 can be used instead. Thus, in accordance with one embodiment of the present invention, the controller 152 of the sensor 150 is further configured to determine a signal-to-noise ratio for each of multiple frequency channels and selects the frequency channel(s) having the highest signal-to-noise ratio as the receiving channel(s), perhaps as part of the calibration process at design time. It is also possible for the controller 152 to then send digital data indicative of the selected receiving channel(s) to the transducer 175 during the transducer mode, as will be described below. The transducer 175, upon receiving and decoding such digital data, then starts transmitting in the selected receiving channel(s). In accordance with another embodiment of the present invention, when two or more combination touch and transducer input systems are used together (e.g., close to each other), the transducers of those systems are configured to transmit electric fields at different frequencies (or at different sets of frequencies) from each other, so as to avoid cross-coupling between the two or more systems.

As described above, the position of the transducer 175 is determined based on measured attributes (e.g., amplitudes, phases, etc.) of a plurality of sensing signals, which are induced in the array of electrodes 154 by the electric field generated by the transducer 175. For example, amplitudes of the multiple signals induced in multiple electrodes, respectively, may be measured and compared with each other to identify the greatest amplitude. The position of the transducer 175 is determined based on the general notion that the signal having the greatest amplitude is induced in the electrode that is closest to the transducer 175. In other embodiments, phases of the multiple signals induced in multiple electrodes, respectively, may be measured and compared with each other to determine the position of the transducer 175. For example, with a 300 MHz transducer signal, the phase difference in signals induced in two electrodes that are 5 cm apart would be 18 degrees. By digitizing the signals using a 600 MHz ADC, their phases can be reconstructed. By monitoring the phase shift in each electrode, the relative movement of the transducer with respect to each electrode can be determined. For instance, continuing with the same example, if the transducer moves by 1 cm away from an electrode, the phase of a signal induced in that electrode would shift by 3.6 degrees. With this method, only the relative movement of the transducer with respect to each electrode is known. By periodically changing the frequencies of the transducer signal, the timing at which different electrodes sense phase shifts can be detected and compared. The first electrode that senses a phase shift after a frequency change is the one that is closest to the transducer. Then, by detecting subsequent phase shifts sensed in other electrodes, the absolute position of the transducer can be determined. Thereafter, with the same frequency, the phase shifts in different electrodes are monitored to determine the relative movement of the transducer with respect to each electrode until the next frequency change, at which time the absolute position of the transducer can be determined again.

According to various exemplary embodiments of the present invention, a curve-fitting technique is employed in determining the position of the transducer 175 based on the attributes (e.g., amplitudes, phases, etc.) of the signals induced in the array of electrodes 154, which are subsequently converted to digital values and filtered. In this regard, the MPU 420 is configured to perform a curve fitting with the digital values, either within MPU 420 or in combination with one or more processors, such as a main processor included in a host device (e.g., a PC that incorporates a combination touch and transducer input system of the invention as an input/display system). Such distributed processing may be used in some applications when the curve-fitting processing is computationally intensive. In this case, the measured and filtered signals from the array of electrodes 154 may be ported from the MPU 420 to the processor in a host system for further processing, and thereafter the resulting signals may be ported back into the MPU 420, via a serial interface such as a selectable USB or RS232 interface (see FIG. 5A).

Any suitable parameterized curve can be used in the curve fitting. In accordance with various exemplary embodiments of the present invention, a suitable curve can be empirically derived for any combination touch and transducer input system including a transducer that has a particular tip (antenna) shape and an array of electrodes that has a particular electrode configuration pattern (i.e., the shape of each electrode and the pattern in which the array of electrodes are arranged). The transducer position determination based on curve-fitting is advantageous in that a suitable curve can be derived for virtually any combination touch and transducer input system, and also a curve derived for a particular combination touch and transducer input system can be robustly applied in the same combination touch and transducer input systems that are then mass produced. This is because the curve-fitting technique is sufficiently robust to account for normal variations expected in the manufacturing processes of the systems, such as in an ITO manufacturing process. Because such curves can be calibrated for a wide variety of different electrode shapes and array patterns, this technique facilitates the use of many different shapes and configurations of the array of electrodes, including those shapes and configurations that have been primarily designed for capacitive touch sensing.

Figure 13A:
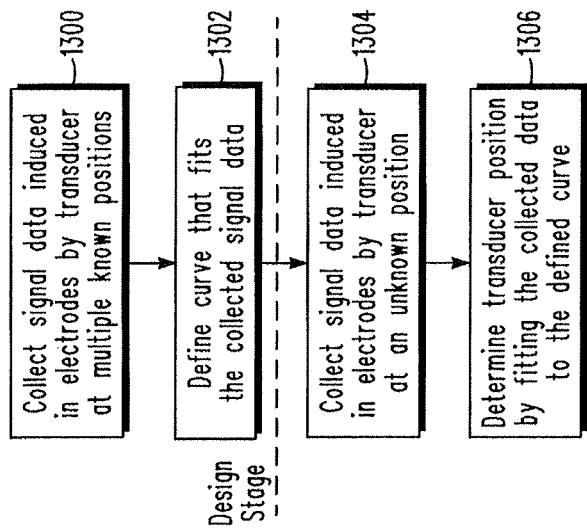
FIG. 13A is a flow chart illustrating a sample process used to determine a position of a transducer based on a curve-fitting technique, according to one embodiment of the invention.
Figure 13B:
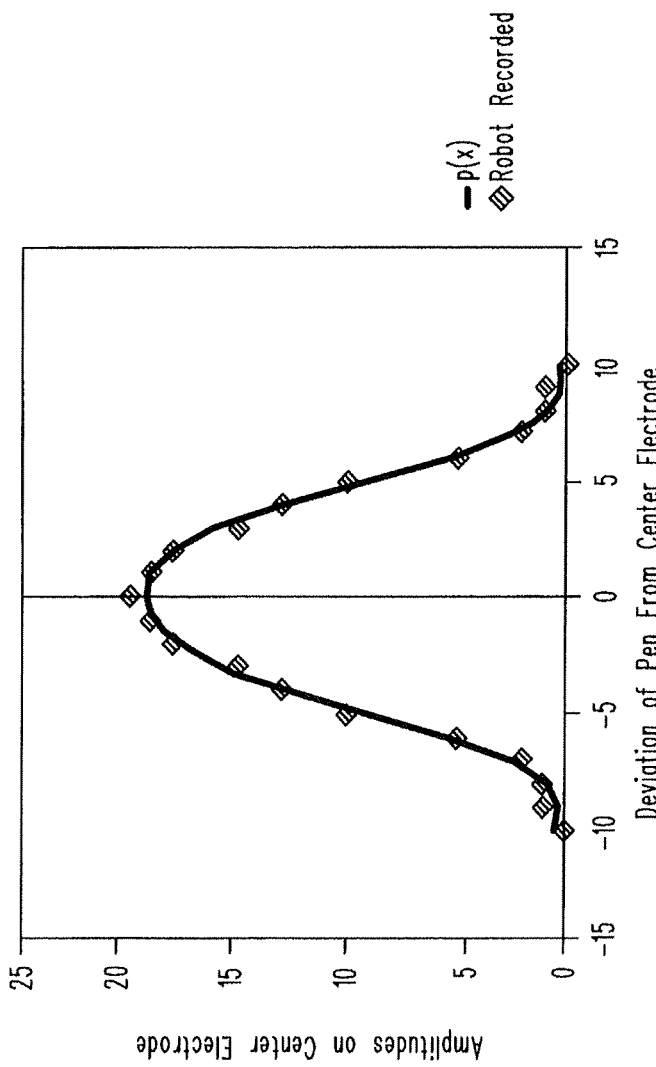
FIG. 13B is a sample parameterized curve that is empirically derived and used to determine the position of a transducer, according to one embodiment of the invention.

FIG. 13A is a flow chart illustrating a sample process used to determine a position of the transducer based on a curve-fitting technique, according to one embodiment of the present invention. In step 1300, signal data induced in the array of electrodes 154 are collected as the transducer 175 is placed at multiple known positions over the array of electrodes. In step 1302, a parameterized curve is defined that best fits the collected signal data. These two steps may be performed at design time, and the defined curve is then stored in the controller 152 of the sensor 150. In step 1304, during a transducer mode, signal data induced in the array of electrodes 154 by the transducer 175 are collected, wherein the position of the transducer is unknown to the controller 152. In step 1306, the position of the transducer is determined by fitting the data collected at step 1304 above to the defined curve. Each of these steps will be described in detail below.

In accordance with exemplary embodiments of the present invention, two fitting curves may be derived, one for the X-position determination and the other for the Y-position determination, though the same curve may be used for both of the X- and Y-position determinations in some applications. For curve-fitting in each of the X and Y directions (columns and rows of the array of electrodes, respectively), the attributes (e.g., amplitudes, phases, etc.) of the signals induced in X electrodes and Y electrodes are established empirically or theoretically. One experimental method of establishing the attributes involves scanning a transducer 175 over and across the array of electrodes 154 with a robotic arm or other suitable instrument. The robotic arm may be commanded to move to a known position, with a known tilt (e.g., during the x-position scan, an angle formed between the transducer axis that lies in the X-Z plane and a line normal to the sensing surface), and with a known height above the sensing surface. During the X-position scan, the attributes of signals induced in the X electrodes are continuously recorded in an automated fashion as the transducer is moved across and over the array of electrodes until a good coverage of the entire array of electrodes is achieved. Together with the movement of the transducer in the X and Y directions, the tilt and/or height of the transducer may also be changed. For example, for twenty (20) X electrodes, 2000 transducer positions (with tilt and/or height) may be used to record the attributes of signals induced in the X electrodes. The actual number of measurements needed would typically depend on the symmetries in the configuration of the array of electrodes 154. If symmetries exist, the measurement data recorded for a portion of the array of electrodes 154 may be used to infer the measurement data for a corresponding symmetrical portion. (Step 1300 in FIG. 13A.) A similar process may be repeated for the Y-position scan.

Once all the measurement data for the X and Y electrodes are empirically or theoretically established, the data can be arranged to be a set of measurement data, in which each position (and tilt/height) of the transducer 175 is associated with the attributes of signals induced in the X and Y electrodes by the electric field generated by the transducer at that position.

Then, the data is applied to appropriate mathematical equation(s) which are used as the curve fitting equation(s). In other words, a curve fitting equation, or a parameterized curve, is established that fits the data. Possible curves that can be used are polynomials, rational polynomials, and combinations of trigonometric, logarithmic, and exponential functions. In very simple geometries, a straight linear interpolation may suffice. A rational polynomial may provide a good compromise between accuracy and speed for computation. For X electrodes that consist of identical rectangular conductor strips, a polynomial may be defined as follows, for example:

$$poly(x) = \frac{ax^4 + bx^2 + c}{dx^4 + ex^2 + f} \qquad \text{Equation (6)}$$

The above equation assumes the ith X electrode in a series of X electrodes as a center electrode, and looks at the expected amplitudes on that ith electrode as the transducer moves from left to right across that ith electrode, wherein x represents the distance from the center of that ith electrode, with x<0 indicating that the transducer is to the left of the center of the ith electrode, x>0 indicating that the transducer is to the right of the center of the ith electrode, and x=0 indicating that the transducer is at the center of the ith electrode. This rational polynomial typically has a peak at x=0 when the transducer is at the center (or right above) of the ith electrode, and the amplitude of the ith electrode decreases as the transducer moves to the left or the right of the ith electrode. An example curve based on Equation (6) is shown in FIG. 13B. In the equation, the values for a, b, c, d, e and f are calibration parameters determined empirically for the particular transducer tip shape and the electrode configuration pattern being used. In this embodiment, because each electrode in the array of electrodes 154 is configured the same, the same curve may be generated for each of the X electrodes. Typically, these calibration parameters would be defined separately for the X and Y electrodes (to thereby produce two curves for X and Y electrodes, respectively), although that is not required in all cases. It should be noted that Equation (6) is one example of a rational polynomial that can be used. Other polynomials or combinations of functions may also be used. (Step 1032 in FIG. 13A.)

With the curve fitting equation (or the parameterized curve) selected, and the calibration values determined empirically, the MPU 420 is now ready to fit the incoming data to the derived curve to determine the position of the transducer 175. This "second" curve fitting can be performed using a variety of different techniques. For example, the position of the transducer can be determined by minimizing the sum of the squares between the curve fitting equation and the measured amplitudes, respectively. One example of this technique involves solving the following problem:

$$\min\left(\sum_{i=1}^{N} \|A_i - p(x_i - x_{pen})\|^2\right) \qquad \text{Problem (7)}$$

In this example, to determine the X position of the transducer, the amplitudes induced in a series (or a plurality of) the X electrodes, such as $x_1, x_2, x_3, x_4, x_5$ are measured as $A_1, A_2, A_3, A_4, A_5$, respectively, and inputted to the problem above, where p(x) is the curve fitting equation derived above. When X electrode $x_3$ is selected as a center electrode, the position of the transducer $x_{pen}$ relative to $x_3$ (e.g., a negative value to the left of the center of $x_3$ and a positive value to the right of the center of $x_3$) can be determined by solving the problem, i.e., by determining the value $x_{pen}$ that minimizes the sum. The process may be then repeated for another set of X electrodes, such as for $x_6$, $x_7$, $x_8$, $x_9$, $x_{10}$. Similarly, the process is repeated to find the value $y_{pen}$, along the Y direction. By performing the curve fitting for both the X position and the Y position, the accurate position of the transducer can be determined. (Steps 1304 and 1306 of FIG. 13A.)

Another technique for fitting the incoming amplitude measurement data to the predefined curve uses the greatest distance between any two points. One example of this technique entails solving the following problem:

$$\min_{x_{pen}} \left\{ \max_i \|A_i - p(x_i - x_{pen})\| \right\} \quad \text{Problem (8)}$$

This technique finds the value $x_{pen}$ that minimizes the greatest distance between any two points, and thus finds the best worst-case fit. This technique may be useful if a derived curve has a very flat response.

As further examples, techniques such as Marquardt-Levenberg and Gauss-Newton can be used to quickly determine the minimum values as in Problems (7) and (8) above. These techniques typically start by using an initial estimate for $x_{pen}$ followed by refining the estimate using the derivatives of p(x). The process is continued iteratively, with the estimate for $x_{pen}$ being adjusted, until little further improvement in the minimum value is achieved. At this point, a minimum value is found and $x_{pen}$ is determined. Another type of curve fit algorithm uses a binary type search. In this case, a likely starting value is chosen, and a value is searched backward and forward, starting with no more than an electrode strip difference, and sub-dividing the difference until a best answer is achieved. This technique may be useful where Marquardt-Levenberg or Gauss-Newton methods are unsuited in a particular application. As another example, a 2D fitting simultaneously for X-Y directions may also be used.

As described above, the attributes of signals induced in the array of electrodes 154 may be measured with the tilt and/or height of the transducer being changed. Thus, a parameterized curve may be derived or adjusted, which further accounts for other data such as the tilt and/or height of the transducer. Then, the height (or "hover") of the transducer above the sensing surface may be found by solving the following problem, for example:

$$\min_{x_{pen},h} \left( \sum_{i=1}^{7} \|A_i - h * p(x_i - x_{pen})\|^2 \right) \quad \text{Problem (9)}$$

In this example, seven X electrodes are used (with $x_4$ as a center electrode), with amplitude Ai detected in the ith electrode, and h is the height. The X position of the transducer $x_{pen}$ relative to $x_4$ and the height h are found by determining the values $x_{pen}$ and h that minimize the sum. In the problem above, note that the signal strength decreases proportionally to 1/h, as the transducer moves away from the sensing surface.

In another example, the tilt of the transducer may be parameterized in terms of the following equation including trigonometric functions, which is suitable for use in a magnetic coupling embodiment:

Equation (10)

$$P = \left| \frac{\sin\left(p_{tilt} + \tan^{-1}\left(\frac{x_i - W_{ito}}{h}\right)\right)}{\sqrt{((x_i - W_{ito})^2 + h^2)}} - \frac{\sin\left(p_{tilt} + \tan^{-1}\left(\frac{x_i + W_{ito}}{h}\right)\right)}{\sqrt{((x_i + W_{ito})^2 + h^2)}} \right|$$

where $P_{tilt}$ is the tilt angle relative to the axis perpendicular to the sensing surface in the X direction, and $W_{ito}$ is the width of one electrode loop.

In another variation on this technique, the curve fitting can be weighted to increase accuracy. Typically this is done by weighting stronger signals a greater amount, as the stronger signals typically have a higher signal to noise ratio. In some cases, it may be desirable to start with an initial estimate for $x_{pen}$ at the center of the strongest-signal electrode. This improves the probability that the actual minimum will be found by a search algorithm.

As used herein, and as supported by the description above, the term "curve fitting" or "fitting" refers to one or more of a wide range of techniques used to construct one or more curves that best fit "test" data and to subsequently use the one or more curves to process "actual" data. Various examples are disclosed, in which a defined curve is fitted to actual data by minimizing error (e.g., the sum of the squares) between the curve and the actual data, or in which the curve is fitted through an iterative process. In other examples, however, a non-iterative process may be used, For example, with least squares linear regression, a good fit can be obtained without iteration and without having to minimize error. It is also possible to sacrifice some positioning data in exchange for a faster algorithm. For example, with certain arrays of electrodes having linear electrodes with good signal to noise ratio, a simple linear interpolation method can be used between two electrodes with the highest amplitudes, to thereby determine the position of the transducer.

As described above, according to various exemplary embodiments of the present invention, the transducer controller 177 selectively generates an electric field at multiple frequencies and, more specifically, at sequentially different frequencies using a frequency hopping technique. Specifically, in various embodiments of the present invention, the MCU 318 in the transducer controller 177 includes an onboard digitally controlled oscillator that is configured to selectively generate an antenna driving signal at a range of different frequencies. Hopping from one frequency to another in driving the antenna 179 correspondingly changes the frequency of the electric field generated by the antenna 179, to achieve improved noise rejection. Furthermore, these different frequencies can be used to encode and send digital data from the transducer 175 to the array of electrodes 154 and hence to the sensor controller 152. For example, suitable Frequency-Shift Keying (FSK) techniques can be used to encode and transmit digital data regarding the transducer, such as pressure data, switch status data, and transducer ID data. The transducer ID data may be useful for the sensor 150 to uniquely identify a particular transducer. For example, when the sensor 150 is used in a point-of-sale system and different sales agents carry different transducers, the sensor can automatically identify a particular sales agent inputting data based on the transducer ID data received from the agent's transducer. As another example, when a plurality of combination touch and transducer input systems in accordance with the present invention are used close to each other, it would be desirable for each sensor to uniquely identify its corresponding transducer (while discriminating against other transducers) so as to process only the signal received from the corresponding transducer.

In accordance with one aspect of the invention, the frequencies used in communication between the transducer 175 and the sensor 150 may be defined by dividing down a known (base) frequency. This method provides an advantage of avoiding harmonics of a base frequency and providing better noise rejection. In one example, the transducer 175 operates in two modes. The first mode is a low power mode, which can generate four frequencies. The second mode is a high power mode, which consumes more power than the low power mode, but provides a larger number of frequencies that are not harmonics of the base frequency. Table 1 below shows the possible frequencies that could be used by the transducer according to one embodiment of the invention.

TABLE 1

| 500 KHz Base Frequency (Low Power) | | 2 MHz Base Frequency (High Power) | |
|---|---|---|---|
| Divisor | Pen Transmit Frequency (KHz) | Divisor | Pen Transmit Frequency (KHz) |
| 2 | 250 | 8 | 250 |
|   |     | 9 | 222 |
|   |     | 10 | 200 |
|   |     | 11 | 182 |
| 3 | 166 | 12 | 166 |
|   |     | 13 | 154 |
|   |     | 14 | 143 |
|   |     | 15 | 133 |
| 4 | 125 | 16 | 125 |
|   |     | 17 | 118 |
|   |     | 18 | 111 |
|   |     | 19 | 105 |
| 5 | 100 | 20 | 100 |

In both the low power mode and the high power mode, usable frequencies are determined by dividing down a base frequency (500 KHz and 2 MHz, respectively). It should be noted that Table 1 above shows merely one example of a set of different frequencies that are usable according to one embodiment of the invention, and other sets of different frequencies may be selected for use in accordance with other embodiments of the invention. Various other methods may be used to select a set of different suitable frequencies, such as a method using Phased Locked Loops (PLLs).

Figure 13C:
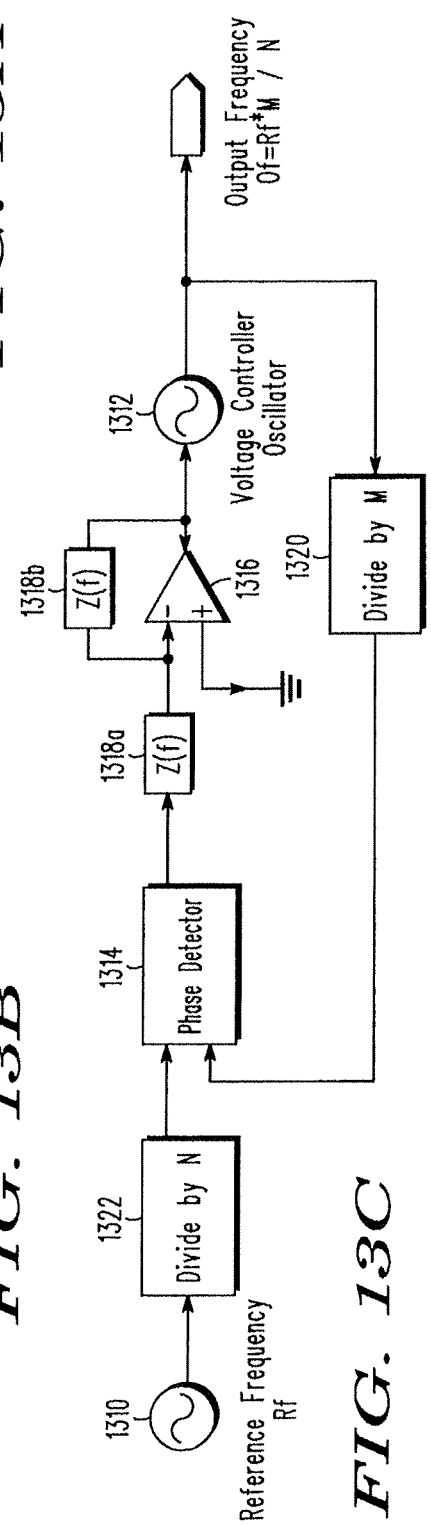
FIG. 13C is a sample phase locked loop (PLL) circuit suitable for generating multiple frequencies for use in accordance with one embodiment of the invention.

Construction of a PLL is well known in the art. A sample PLL suitable for use pursuant to an embodiment of the present invention is shown in FIG. 13C, which includes a reference frequency (Rf) 1310, a Voltage Controlled Oscillator (VCO) 1312, a phase detector 1314, and a loop filter consisting of an operational amplifier 1316 and two resistors 1318a and 1318b. To generate different frequencies from the reference frequency (Rf), the PLL includes one or more frequency dividers ("M" divider 1320 and "N" divider 1322 in the illustrated embodiment). The illustrated PLL can generate frequencies of the form M/N based on the reference frequency (Rf). This allows a vast range of frequencies to be created, which share a base frequency that is a fraction of a hertz. For example, if N can range from 1 to 16, one may select 16, 15, 13, and 11 as the divisors in the "N" divider 1322. If 11 or 7 is selected as the divisor in the "M" divider 1320, and the reference frequency (Rf) is 500 KHz, the following output frequencies could be generated:

11/16*500 KHz=343.75 KHz
11/15*500 KHz=366.67 KHz
11/13*500 KHz=423.08 KHz
7/11*500 KHz=318.18 KHz

These frequencies all share a fundamental frequency of less than ¼ of a hertz. The PLL can advantageously generate a range of frequencies that are closer together with little similar harmonic content. This allows for the use of narrower bandpass filters (508) in the analog processing stage 414 of the sensor controller 152, thereby increasing the signal to noise ratio before the digitization of the signal.

In one embodiment, the transducer 175 is configured to generate four different frequencies within a specified range (e.g., 100 kHz, 125 kHz, 166 kHz, and 250 kHz as in the "low power" mode in Table 1 above). The transducer controller 177 is configured to switch between these four different frequencies as needed for noise rejection or to encode digital data in frequency shifts. A variety of techniques can be used to encode digital data using frequency hopping, and any suitable Frequency-Shift Keying (FSK) technique may be used. Additionally or alternatively, any suitable Amplitude-Shift Keying (ASK) technique, Phase-Shift Keying (PSK) technique, or more complicated encoding schemes such as Quadrature Amplitude Modulation (QAM) scheme may be used to encode digital data.

As one specific example, Manchester type code may be used to encode digital data, wherein a transition of frequencies from high to low transmits a "1," while a transition of frequencies from low to high transmits a "0." Table 2 below illustrates a sample data encoding scheme based on Manchester type code.

TABLE 2

| Encoding | Meaning |
|---|---|
| 111 | Start of frame (SOF) |
| 001 | Send a 0 |
| 011 | Send a 1 |
| 000 | End of frame (EOF) |

Figure 14:
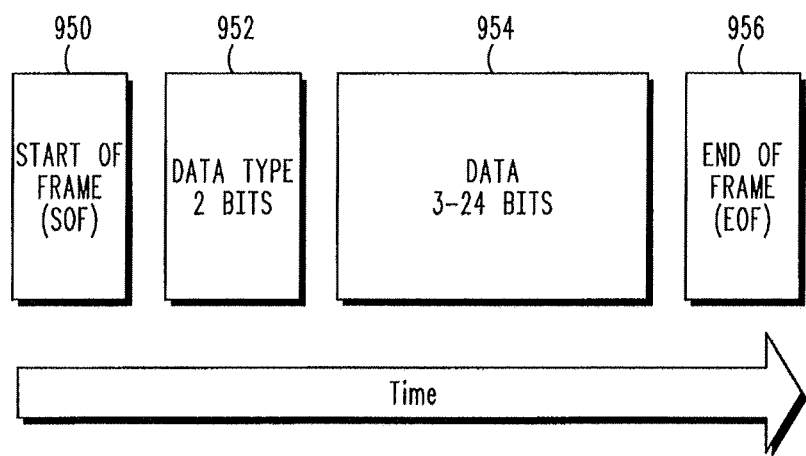
FIG. 14 shows a sample data frame used to transmit digital data between a transducer and a sensor in a combination touch and transducer input system, according to one embodiment of the invention.

As shown above, three successive transitions of high to low ("111") indicate a start of frame (SOF), and three successive transitions of low to high ("000") indicate an end of frame (EOF). In between the SOF and EOF, any three transitions of "001" sends a "0" and any three transitions of "011" sends a "1." These digital data (SOF, 0, 1, and EOF) are transmitted in data frames, an example of which is shown in FIG. 14. The data frame as shown in FIG. 14 has a unique start bit sequence (SOF) and end bit sequence (EOF) and, therefore, can have different lengths. The data frame of FIG. 14 includes a start of frame (SOF) block 950, followed by a data type block 952 (2 bits), a payload data block 954 (3-24 bits), and finally by an end of frame (EOF) block 956. Table 3 below shows one example of data frame formats for each type of data.

TABLE 3

| Data Type | Value | Data Length (bits) | Comments |
|---|---|---|---|
| Pen ID | 00 | 24 | Enough for 16 million unique factory-programmed pen ID's |
| Switch | 01 | 3 | Can provide for 3 switches, each with two or more states (e.g., ON/OFF) |
| Pressure | 10 | 8 | Up to 256 pressure values |

In the above example, 2 bits of "00" indicate "pen ID" data, to be followed by 24 bits indicating a unique pen ID number. 2 bits of "01" indicate "switch status" data, to be followed by 3 bits indicating a status of one of up to three switches. Finally, 2 bits of "10" indicate "pressure" data, to be followed by 8 bits indicating the detected pressure value. Though only three types of data are shown above, more or different types of data may be defined to be digitally encoded. For example, data derived from any other sensors provided on the transducer 175, such as a tilt sensor or a rotational sensor, or the operating mode of the transducer 175 (e.g., "awake mode" or "sleep mode") may be defined and digitally encoded.

Table 4 below shows one example of a data frame containing switch status data.

TABLE 4

| SOF | | 0 | | 1 | | 1 | | 0 | | 0 | | EOF |
|---|---|---|---|---|---|---|---|---|---|---|---|---|
| 1 1 1 | 0 0 1 | 0 1 1 | 0 1 1 | 0 0 1 | 0 0 1 | 0 0 0 |

In the example above, first, three successive frequency transitions of high to low ("111") indicate a start of frame (SOF). The next 2 bits of "01" are generated by the frequency transitions of "001" and "011" and indicate that this data frame includes "switch status" data and that the payload data are 3-bits long. The following 3 bits of "100" are generated by the frequency transitions of "011," "001" and "001," respectively, and indicate that a first switch is pressed. Lastly, the three successive frequency transitions of low to high ("000") indicate an end of frame (EOF).

The rate of data transmission provided by the methods described above would depend upon the rate of frequency hopping. For example, if the frequency hopping can be made to occur every 250 µs, with four possible frequencies, the system can transmit a throughput of 1000 bits per second.

The present invention is not limited to the particular examples described above, and various other digital encoding or modulation techniques may be used as well as other data frame formats. For example, other encoding techniques with advanced features such as error correction may be used (e.g., Reed-Solomon coding technique).

Figure 15:
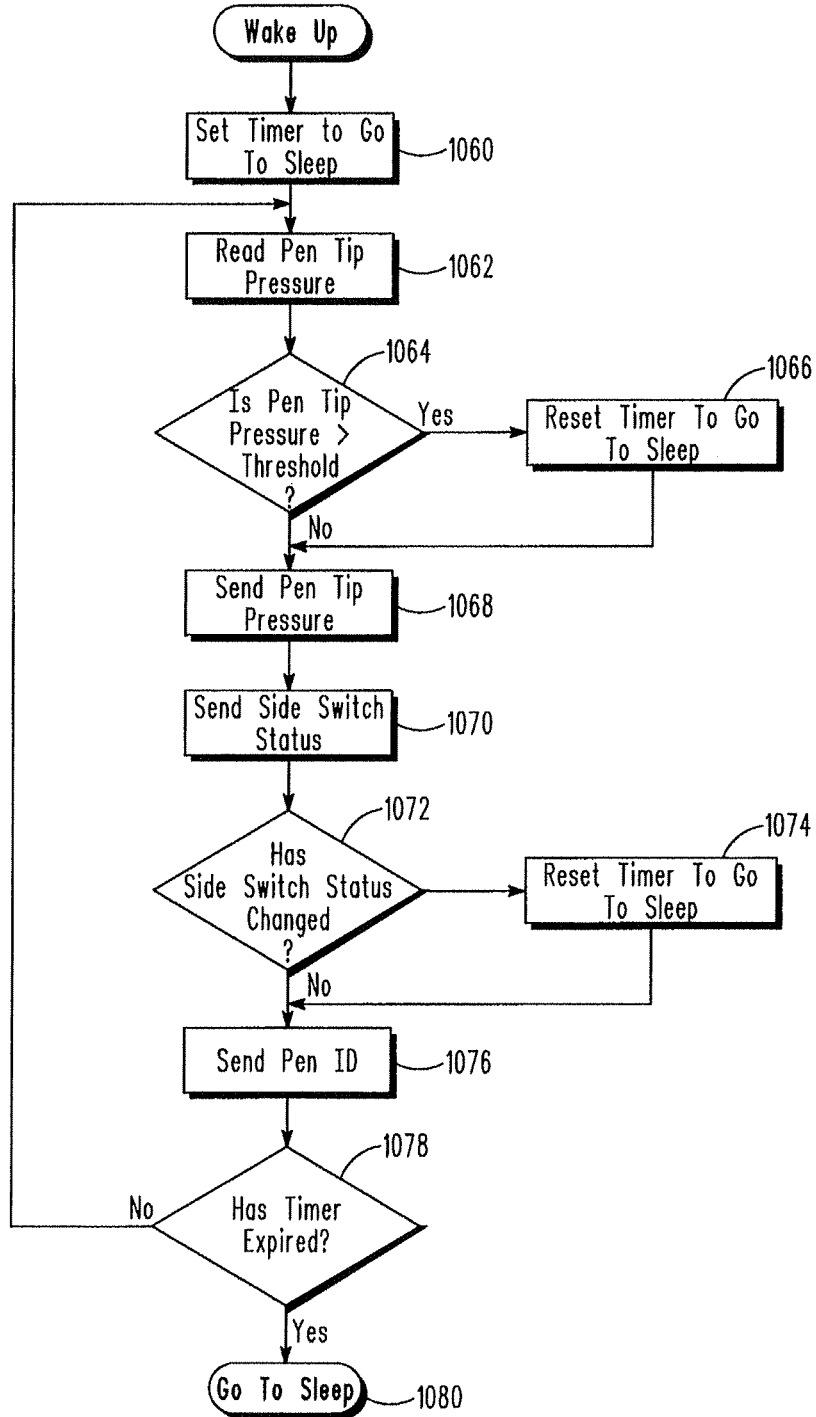
FIG. 15 is a flow chart illustrating a process performed by a transducer, including the process of encoding and transmitting digital data to a sensor, according to one embodiment of the invention.

FIG. 15 is a flow chart illustrating an exemplary process to be performed generally by the transducer controller 177, and more specifically by the MCU 318 thereof, including the process of encoding and transmitting digital data to the sensor 150, according to one embodiment of the invention. After the transducer "wakes up," in step 1060, a timer is set to go to "sleep." Once the timer is set to "sleep" and a certain amount of time elapses, i.e., when the timer expires, the transducer goes to "sleep." In step 1062, the pen tip pressure is read from the pressure sensor 306. In step 1064, it is determined whether the pen tip pressure detected in step 1062 is above a threshold value. If yes, proceeding to step 1066, the timer is reset to go to "sleep." Then, in step 1068, the pen tip pressure is encoded as digital data and transmitted to the sensor 150. Likewise, in step 1070, the side switch status is encoded as digital data and transmitted to the sensor 150. In step 1072, it is determined whether the side switch status has been changed. If yes, in step 1074, the timer is reset to go to "sleep." Then, in step 1076, pen ID information is encoded as digital data and transmitted to the sensor 150. In step 1078, it is determined whether the timer has expired. If not (for example, due to the timer having been reset in steps 1066 and 1074), the process returns to step 1062, and the pen tip pressure is read again and the process repeats itself. If, on the other hand, it is determined in step 1078 that the timer has expired, it proceeds to step 1080 and the transducer goes to "sleep." Thus, the transducer wakes up (and resets the "sleep" timer) whenever an interrupt is generated. An interrupt is generated when the detected pen tip pressure exceeds a threshold value (step 1064) or when the side switch status has been changed (step 1072).

Figure 16:
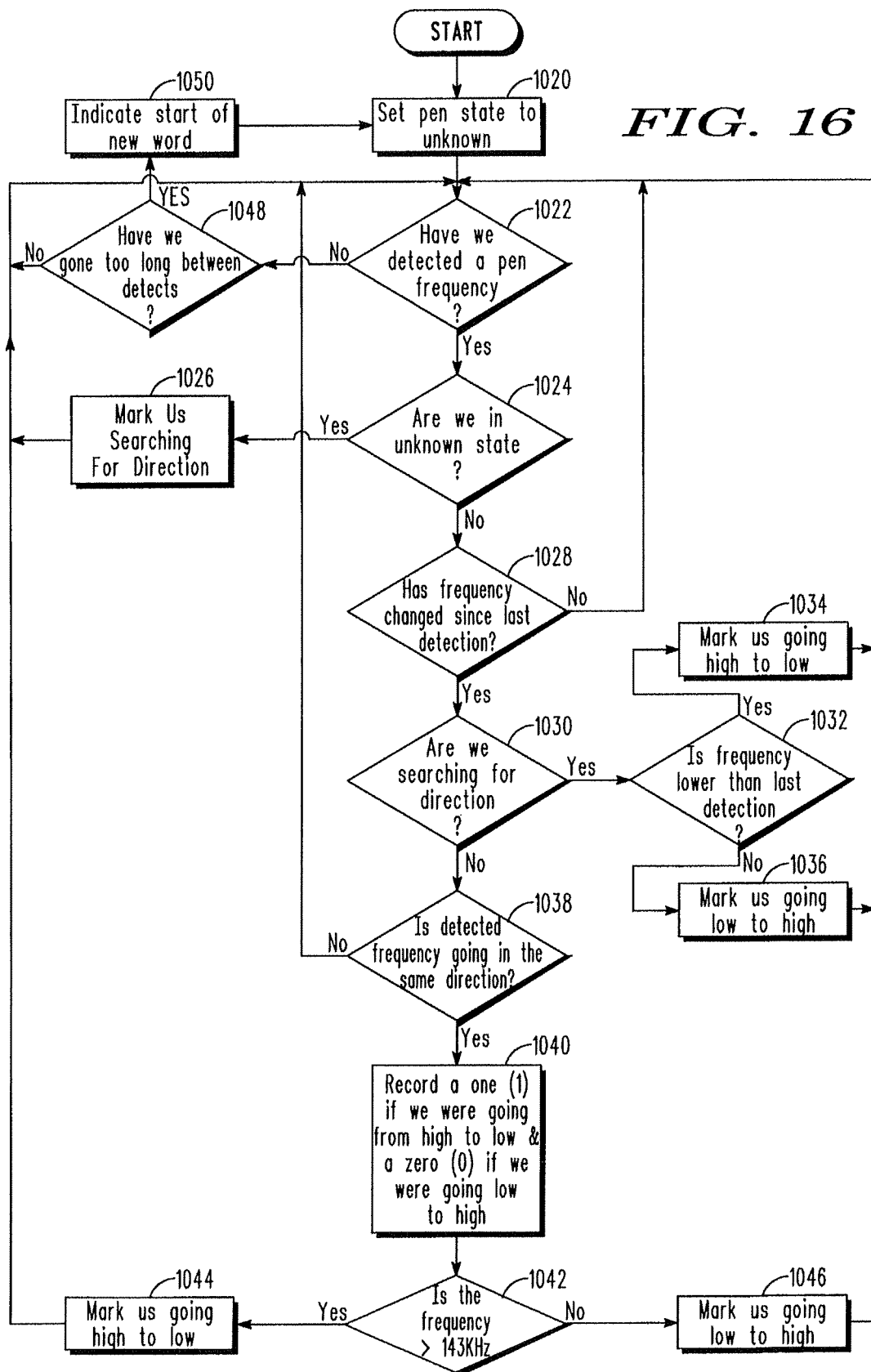
FIG. 16 is a flow chart illustrating a process of decoding digital data encoded in frequency shifts of a signal generated by a transducer, according to one embodiment of the invention.

FIG. 16 is a flow chart illustrating an exemplary process to be performed generally by the sensor controller 152 for decoding digital data encoded in frequency shifts of a signal generated by the transducer 175. In step 1020, a pen frequency state is set to "unknown." In step 1022, it is determined whether a pen frequency has been detected. If yes, in step 1024, it is determined whether the pen frequency state is "unknown." Specifically, in this example, there may be ten frequency states that are predefined. If the frequency detected in step 1022 is not any of the "known" frequency states, then proceeding to step 1026, it is marked that the frequency-moving direction (is unknown and thus) needs to be searched, and thereafter returning to step 1022 it is determined whether a pen frequency has been detected. If in step 1024 it is determined that the pen frequency detected in step 1022 is one of the "known" frequency states, then proceeding to step 1028, it is determined whether the frequency has changed since the last detection. If no, again returning to step 1022, it is determined whether a pen frequency has been detected.

If, in step 1028, it is determined that the frequency has changed since the last detection, proceeding to step 1030, it is determined whether the frequency-moving direction needs to be searched. Initially, the frequency-moving direction is unknown and thus needs to be searched. Therefore, proceeding to step 1032, it is determined whether the presently-detected frequency is lower than the last-detected frequency. If yes, proceeding to step 1034, it is marked that the frequency is going "high to low," while if no, proceeding to step 1036, it is marked that the frequency is going "low to high." From either of steps 1034 and 1036, returning to step 1022, it is again determined whether a pen frequency has been detected ("yes" in this case coming from either of steps 1034 and 1036). Proceeding down to step 1028, if it is determined that the frequency has changed since the last detection ("yes" in this case coming from either of steps 1034 and 1036), in step 1030, it is determined whether the frequency-moving direction needs to be searched. At this time, the frequency-moving direction has already been marked as either "high to low" (in step 1034) or "low to high" (in step 1036). Thus, the frequency-moving direction need not be searched, and proceeding to step 1038, it is determined whether the presently-detected frequency has moved from the last-detected frequency in the same direction as the frequency-moving direction as previously marked in steps 1034 or 1036. If yes, proceeding to step 1040, "1" is recorded if the frequency-moving direction is "high to low" and "0" is recorded if the frequency-moving direction is "low to high."

Thereafter, proceeding to step 1042, it is determined whether the presently-detected frequency is greater than a predefined threshold, such as 143 kHz in the illustrated embodiment. The threshold is predefined generally near a middle point in the range of predefined frequencies (e.g., 143 kHz, within the range expanding from 100 kHz to 250 kHz in the illustrated embodiment). If the presently-detected frequency is greater than the predefined threshold, in step 1044 it is marked that the frequency-moving direction is "high to low," while if the presently-detected frequency is equal to or less than the predefined threshold, in step 1046 it is marked that the frequency-moving direction is "low to high." From either of steps 1044 and 1046, returning to step 1022, it is again determined whether a pen frequency has been detected. If not, proceeding to step 1048, it is determined whether more than a predefined amount of time has elapsed since the last detection of a frequency. If so, proceeding to step 1050, a start of a new word (or a new data frame) is indicated.

In some embodiments of the present invention, digital encoding and communication using frequency hopping is achieved bi-directionally between the transducer 175 and the sensor 150. Digital data can be encoded in a similar manner by the sensor 150 and transmitted to the transducer 175. The types of data that are digitally encoded by the sensor 150 may include, for example, sensor ID data, receiving channel data (i.e., which frequency channels should be used), and the operating mode of the sensor 150. Further additionally or alternatively, digital data regarding pressure, switch status, pen ID and others, may be transmitted between the transducer 175 and the sensor 150 using other RF techniques such as via a Bluetooth® device pursuant to IEEE 802.15 standards including Bluetooth and ZigBee protocols.

According to one aspect of the invention, a cordless transducer 175 is provided, which is configured for use with an array of electrodes 154, wherein the cordless transducer 175 and the array of electrodes 154 are capacitively coupled. The cordless transducer 175 includes a pen-shaped housing (330 in FIG. 3B) including a pen tip (179 in FIG. 3B) at its distal end, and a transducer controller 177 arranged within the pen-shaped housing 330. The transducer controller 177 controls the operation of the cordless transducer 175, and includes a pressure sensor 306 for detecting the pressure applied to the pen tip. The cordless transducer 175 also includes an antenna 179 coupled to the transducer controller 177 to transmit the pressure sensor data, which is detected by the pressure sensor 306, as digital data to the array of electrodes 154. The transducer controller 177 includes a power storage device, such as a battery or a capacitor (314), which supplies power to drive the transducer controller 177 and the antenna 179, to thereby achieve the cordless transducer.

The cordless transducer 175, described above, may be provided with a suitable sensor 150 to together form a combination touch and transducer input system. In some embodiments, the combination touch and transducer input system may further include a docking (charging) station, suitably formed to receive the cordless transducer 175 therein to charge the capacitor (314 in FIG. 4) via the charge input connector 315.

According to a further aspect of the invention, a method is provided for selectively determining a position of a proximate object and a position of a transducer. The method includes eight steps. First, the proximate object is capacitively sensed with an array of electrodes 154. Second, a position of the proximate object is determined based on the capacitive sensing. Third, an electric field is generated with the transducer 175. Fourth, digital data is transmitted from the transducer 175. Fifth, a plurality of sensing signals are induced based on the electric field in a corresponding plurality of electrodes in the array of electrodes 154. Sixth, attributes of the plurality of sensing signals are measured. Seventh, a position of the transducer 175 is determined based on the measured attributes of the plurality of sensing signals. Eighth, the digital data is received with the array of electrodes 154.

According to one aspect of the invention, the transducer 175 and the sensor 150 can communicate asynchronously for the purpose of both transducer position determination and digital data communication. Specifically, because the systems and methods of the present invention according to some embodiments rely on determining the amplitude and frequencies of the signals induced in the electrodes, it does not require a specific phase correlation between the transducer 175 and the sensor 150. This has many potential advantages. For example, it does not require the use of a wired or dedicated wireless link for syncing. Dedicated wireless links for syncing can require a bulky transmitter on the part of the sensor 150. Furthermore, the dedicated wireless links for syncing could provide a possible source of interference with other devices, and also are more likely to be interfered with by other devices. Additionally, the asynchronous design achievable with the present invention facilitates the use of different frequencies between the transducer 175 and the sensor 150. Asynchronous designs are also less likely to degrade over time, and are more likely to be compatible with a wide range of devices.

The embodiments and examples set forth herein were presented in order to describe the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A position input system, comprising:
an array of electrodes; and
a controller coupled to the array of electrodes and configured to:
when operating in a touch mode, determine a position of a proximate object by capacitively sensing the object with the array of electrodes, and
when operating in a transducer mode, determine a position of a transducer by measuring a sensing signal which is induced in the array of electrodes by a magnetic field component of an electromagnetic field generated by the transducer,
wherein:
one side of the array of electrodes are connected to a set of switches; and
the controller is configured to, in the transducer mode, control the set of switches to make the array of electrodes to form loop electrodes in which the sensing signal is electromagnetically induced.

2. The position input system of claim 1, wherein:
the array of electrodes include a first electrode and a second electrode; and
the controller is configured to, in the transducer mode, control the set of switches to:
connect one end of the first electrode to the controller; and connect one end of the second electrode to a reference voltage.

3. The position input system of claim 2, wherein:
another end of the first electrode is connected by a trace to another end of the second electrode.

4. A position input system, comprising:
an array of electrodes, wherein
one ends of the electrodes are connected to each other by a trace; and
other ends of the electrodes are connected to a set of switches, and
a controller coupled to the array of electrodes and configured to control the set of switches to selectively form loop coils in which sensing signals are induced by a magnetic field component of an electromagnetic field generated by a transducer, wherein:
the array of electrodes include a first electrode and a second electrode which form a first loop coil; and
the controller is configured to control the set of switches to:
connect the first electrode to a detection section of the controller; and
connect the second electrode to a reference voltage.

5. The position input system of claim 4, wherein:
the controller is configured to control the set of switches to:
leave electrodes of the array of electrodes, other than the first electrode and the second electrode, unconnected to either the detection section of the controller or to the reference voltage.

6. A method of controlling a position input system which includes an array of electrodes, the method comprising:
in a touch mode, determining a position of a proximate object by capacitively sensing the object with the array of electrodes, and
in a transducer mode, determining a position of a transducer by measuring a sensing signal which is induced in the array of electrodes by a magnetic field component of an electromagnetic field generated by the transducer, wherein:
one side of the array of electrodes are connected to a set of switches; and
the method comprises:
in the transducer mode, controlling the set of switches to make the array of electrodes to form loop electrodes in which the sensing signal is electromagnetically induced.

7. The method of claim 6, wherein:
the array of electrodes include a first electrode and a second electrode; and
the method comprises, in the transducer mode, controlling the set of switches to:
connect one end of the first electrode to a detection controller; and
connect one end of the second electrode to a reference voltage.

8. The method of claim 7, wherein:
another end of the first electrode is connected by a trace to another end of the second electrode.

9. A method of controlling a position input system which includes an array of electrodes, wherein one ends of the electrodes are connected to each other by a trace and other ends of the electrodes are connected to a set of switches, the method comprising:
controlling the set of switches to selectively form loop coils in which sensing signals are induced by a magnetic field component of an electromagnetic field generated by a transducer, wherein:
the array of electrodes include a first electrode and a second electrode which form a first loop coil; and
the method comprises controlling the set of switches to:
connect the first electrode to a detection controller; and
connect the second electrode to a reference voltage.

10. The method of claim 9, comprising:
controlling the set of switches to:
leave electrodes of the array of electrodes, other than the first electrode and the second electrode, unconnected to either the detection controller or to the reference voltage.

\* \* \* \* \*